US008501869B2

(12) United States Patent
Oda et al.

(10) Patent No.: US 8,501,869 B2
(45) Date of Patent: Aug. 6, 2013

(54) BLOCK COPOLYMER COMPOSITION AND HOT-MELT ADHESIVE COMPOSITION

(75) Inventors: Ryouji Oda, Tokyo (JP); Sadaharu Hashimoto, Tokyo (JP); Ayako Furuko, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 13/142,065

(22) PCT Filed: Dec. 25, 2009

(86) PCT No.: PCT/JP2009/071684
§ 371 (c)(1),
(2), (4) Date: Jun. 24, 2011

(87) PCT Pub. No.: WO2010/074267
PCT Pub. Date: Jul. 1, 2010

(65) Prior Publication Data
US 2011/0257337 A1 Oct. 20, 2011

(30) Foreign Application Priority Data

Dec. 26, 2008 (JP) ................................. 2008-335330
Feb. 27, 2009 (JP) ................................. 2009-047402

(51) Int. Cl.
*C08L 53/02* (2006.01)
*C08F 297/04* (2006.01)
*C08J 5/18* (2006.01)

(52) U.S. Cl.
USPC .......................................... 525/89; 525/271

(58) Field of Classification Search
USPC ................................................ 525/89, 271
See application file for complete search history.

(56) References Cited

U.S. PATENT DOCUMENTS

| 4,104,327 | A | 8/1978 | Inoue et al. |
| 4,335,221 | A | 6/1982 | Gerberding |
| 4,386,125 | A | 5/1983 | Shiraki et al. |
| 4,699,938 | A | 10/1987 | Minamizaki et al. |
| 4,939,207 | A | 7/1990 | Fasulo et al. |
| 5,290,842 | A | 3/1994 | Sasaki et al. |
| 5,723,222 | A | 3/1998 | Sato et al. |
| 6,329,459 | B1 | 12/2001 | Kang et al. |
| 6,344,518 | B1 | 2/2002 | Kobayashi et al. |
| 6,531,263 | B2 | 3/2003 | Knoll |
| 6,593,430 | B1 | 7/2003 | Knoll et al. |
| 7,318,985 | B2 | 1/2008 | Tsubaki et al. |
| 2004/0242775 | A1 | 12/2004 | Tahara et al. |
| 2005/0009990 | A1 | 1/2005 | Knoll et al. |
| 2005/0233249 | A1 | 10/2005 | Muldermans et al. |
| 2006/0099373 | A1 | 5/2006 | Dupont et al. |
| 2006/0205874 | A1 | 9/2006 | Uzee et al. |
| 2006/0205877 | A1 | 9/2006 | DuBois |
| 2006/0235165 | A1 | 10/2006 | Kawanabe et al. |
| 2008/0318161 | A1 | 12/2008 | Nakano et al. |
| 2011/0046307 | A1* | 2/2011 | Takeshi et al. ................ 525/89 |

FOREIGN PATENT DOCUMENTS

| EP | 1625178 B1 | 7/2007 |
| GB | 1395822 A | 5/1975 |
| JP | 51-125135 A | 11/1976 |
| JP | 56-59230 A | 5/1981 |
| JP | 57-178722 A | 11/1982 |
| JP | 59-187048 A | 10/1984 |
| JP | 61-231070 A | 10/1986 |
| JP | 63-66277 A | 3/1988 |
| JP | 63-179956 A | 7/1988 |
| JP | 64-65152 A | 3/1989 |
| JP | 64-79251 A | 3/1989 |
| JP | 2-222440 A | 9/1990 |
| JP | 5-93176 A | 4/1993 |
| JP | 5-263056 A | 10/1993 |
| JP | 5-287084 A | 11/1993 |
| JP | 8-60121 A | 3/1996 |
| JP | 8-283685 A | 10/1996 |
| JP | 9-66554 A | 3/1997 |
| JP | 9-78048 A | 3/1997 |
| JP | 11-12430 A | 1/1999 |
| JP | 2000-155418 A | 6/2000 |
| JP | 2000-204129 A | 7/2000 |
| JP | 2001-504519 A | 4/2001 |
| JP | 2001-520244 A | 10/2001 |
| JP | 2002-60583 A | 2/2002 |
| JP | 2002-72457 A | 3/2002 |
| JP | 2002-519465 A | 7/2002 |
| JP | 2003-73434 A | 3/2003 |
| JP | 2003-261740 A | 9/2003 |
| JP | 2004-107519 A | 4/2004 |
| JP | 2004-238548 A | 8/2004 |
| JP | 2004-331707 A | 11/2004 |

(Continued)

OTHER PUBLICATIONS

International Search Report, PCT/JP2009/071684, Feb. 2, 2010.
Notice of Allowance for U.S. Appl. No. 13/255,354, dated Mar. 18, 2013.
Office Action for U.S. Appl. No. 13/141,950, dated Mar. 21, 2013.
Office Action for U.S. Appl. No. 13/138,493, dated Feb. 19, 2013.
Extended European Search Report for European Application No. 10746236.8, dated Jun. 22, 2012.
International Search Report for International Application No. PCT/JP2009/056449, dated Jun. 9, 2009.
International Search Report for International Application No. PCT/JP2009/071692, dated Feb. 23, 2010.

(Continued)

*Primary Examiner* — Jeffrey Mullis
(74) *Attorney, Agent, or Firm* — Birch, Stewart, Kolasch & Birch, LLP

(57) ABSTRACT

Provided is a hot-melt adhesive composition which can be easily applied at a relatively low temperature, has a long open time, and also has high holding power. A hot-melt adhesive composition comprising a block copolymer composition which includes a block copolymer A and a block copolymer B, and a tackifying resin, wherein a weight ratio (A/B) of the block copolymer A and the block copolymer B is 25/75 to 90/10, and an aromatic vinyl monomer unit content of the block copolymer A is 41% or greater.

4 Claims, No Drawings

(56) References Cited

FOREIGN PATENT DOCUMENTS

| | | |
|---|---|---|
| JP | 2005-510612 A | 4/2005 |
| JP | 2005-232246 A | 9/2005 |
| JP | 2006-89546 A | 4/2006 |
| JP | 2006-514338 A | 4/2006 |
| JP | 2006-241177 A | 9/2006 |
| JP | 2006-520826 A | 9/2006 |
| JP | 2006-274158 A | 10/2006 |
| JP | 2006-282683 A | 10/2006 |
| JP | 2006-528273 A | 12/2006 |
| JP | 2007-230180 A | 9/2007 |
| JP | 200/-7654 A | 1/2008 |
| JP | 2008-533230 A | 8/2008 |
| WO | WO 97/30844 A | 8/1997 |
| WO | WO 99/19388 A1 | 4/1999 |
| WO | WO 00/00546 A1 | 1/2000 |
| WO | WO 03/020825 A1 | 3/2003 |
| WO | WO 2004/074392 A1 | 9/2004 |
| WO | WO 2004/076556 A1 | 9/2004 |
| WO | WO 2004/104095 A1 | 12/2004 |
| WO | WO 2005/031459 A1 | 4/2005 |
| WO | WO 2006/051863 A1 | 5/2006 |
| WO | WO 2007/072613 A1 | 6/2007 |
| WO | WO 2009/123089 A1 | 10/2009 |
| WO | WO2009123089 | * 10/2009 |

OTHER PUBLICATIONS

International Search Report for International Application No. PCT/JP2010/052879, dated Mar. 23, 2010.
International Search Report for International Application No. PCT/JP2010/055580, dated Jun. 15, 2010.
International Search Report for International Application No. PCT/JP2010/055581, dated Jun. 29, 2010.
International Search Report for International Application No. PCT/JP2010/060760, dated Aug. 10, 2010.
US Office Action for U.S. Appl. No. 12/935,361, dated Aug. 31, 2012.
US Office Action for U.S. Appl. No. 13/141,950, dated Sep. 11, 2012.
US Office Action for U.S. Appl. No. 13/255,354, dated Aug. 31, 2012.
United States Office Action for copending U.S. Appl. No. 13/255,217 dated Apr. 3, 2013.

* cited by examiner

BLOCK COPOLYMER COMPOSITION AND HOT-MELT ADHESIVE COMPOSITION

TECHNICAL FIELD

The present invention relates to a hot-melt adhesive composition, and more particularly, to a hot melt adhesive which is suitably used for adhesion of members that constitute paper diapers, sanitary products and the like, and which can be easily applied at a relatively low temperature, has a long open time, and also has high holding power.

BACKGROUND ART

Hot melt adhesives are adhesives which are capable of efficiently adhering a variety of products due to their feature of solidifying in a short time period, and are highly safe to human body since the adhesives do not require a solvent. Therefore, the hot melt adhesives are utilized in various fields. For example, in the manufacture of hygiene products such as paper diapers and sanitary products, hot melt adhesives are routinely used to bond members that constitute those products. Furthermore, hot melt adhesives are also routinely used as adhesives that are used in various adhesive tapes, labels for office use or industrial use, and the like.

Various polymers are used as base polymers that constitute hot melt adhesives. As the hot melt adhesives used for the manufacture of hygiene products, hot melt adhesives which use aromatic vinyl-conjugated diene-aromatic vinyl block copolymers such as a styrene-isoprene-styrene block copolymer (SIS) or a styrene-butadiene-styrene block copolymer (SBS) as base polymers, are used to a large extent since these adhesives have excellent adhesiveness to polyolefins that are frequently used as a material for the members of hygiene products.

However, hot melt adhesives that are used for the manufacture of hygiene products are required to have various performances, and among them, performances such as easy appliability at a relatively low temperature, a long open time after coating, and excellent holding power or tackiness are strongly demanded. In order to achieve such demanded performances, extensive investigations have been conducted on hot melt adhesives which use aromatic vinyl-conjugated diene-aromatic vinyl block copolymers as base polymers.

For example, Patent Literature 1 discloses that a hot melt adhesive which has excellent low temperature adhesive force, has low melt viscosity, and has high adhesive force and high tack force is obtained by constructing a hot melt adhesive using an aromatic vinyl-conjugated diene-aromatic vinyl block copolymer having two aromatic vinyl blocks with different molecular weights. The hot melt adhesive described in this Patent Literature 1 has low viscosity at 160° C., but the viscosity rapidly increases at temperatures lower than 160° C. Accordingly, the hot melt adhesive has a problem that application at lower temperature is difficult, and the open time after application is not sufficient.

Furthermore, Patent Literature 2 discloses that an elastomer composition containing a branched aromatic vinyl-isoprene block copolymer, a linear aromatic vinyl-isoprene block copolymer and polyisoprene, has satisfactory holding power and initial adhesive force (tackiness) and is used as a hot melt adhesive having low viscosity at a relatively low temperature. When this elastomer composition described in Patent Literature 2 is used, it is possible to lower the viscosity at a relatively low temperature, but it cannot be said that the extent of improvement thereon is sufficient, and a new improvement is desired.

CITATION LIST

Patent Literature

Patent Literature 1: Japanese Patent Application Laid-Open (JP-A) No. H08-283685
Patent Literature 2: JP-A No. 2006-274158

SUMMARY OF INVENTION

Technical Problem

An object of the present invention is to provide a hot-melt adhesive composition which can be easily applied at a relatively low temperature, has a long open time, and also has high holding power.

Solution to Problem

The inventors of the present invention conducted a thorough investigation in order to achieve the object described above, and as a result, they found that when a tackifying resin is incorporated into a block copolymer composition formed by mixing an asymmetric aromatic vinyl-conjugated diene-aromatic vinyl block copolymer having two aromatic vinyl polymer blocks with different weight average molecular weights and an aromatic vinyl-conjugated diene-aromatic vinyl block copolymer having a particular constitution different from that of the foregoing block copolymer, at a specific proportion, a hot-melt adhesive composition which has low melt viscosity at a relatively low temperature, has a long open time since the increase in melt viscosity concomitant with a decrease in temperature is mild, and has high holding power after adhesion, is obtained. The present invention was finally completed based on this finding.

Thus, the present invention provides a hot-melt adhesive composition comprising a block copolymer composition which includes a block copolymer A represented by the following general formula (A) and a block copolymer B represented by the following general formula (B), and a tackifying resin, wherein a weight ratio (A/B) of the block copolymer A and the block copolymer B in the block copolymer composition is 25/75 to 90/10, and an aromatic vinyl monomer unit content of the block copolymer A is 41% or greater:

(A)

(B), in the general formulas (A) and (B), $Ar1^a$ and $Ar^b$ each represent an aromatic vinyl polymer block having a weight average molecular weight of 6,000 to 15,000; $Ar2^a$ represents an aromatic vinyl polymer block having a weight average molecular weight of 40,000 to 400,000; $D^a$ and $D^b$ each represent a conjugated diene polymer block having a vinyl bond content of 1 mol% to 20 mol%; X represents a single bond, or a residue of a coupling agent; and n represents an integer of 2 or greater.

Furthermore, the present invention provides the hot-melt adhesive composition, wherein in the block copolymer composition, a content of an aromatic vinyl monomer units relative to all monomer units constituting polymer components in the block copolymer composition is 20% to 70% by weight.

Furthermore, the inventors of the present invention also found that when a block copolymer composition is constructed by mixing an asymmetric aromatic vinyl-conjugated diene-aromatic vinyl block copolymer having two aromatic vinyl polymer blocks with different weight average molecular weights, an aromatic vinyl-conjugated diene-aromatic vinyl block copolymer having a particular constitution different from that of the foregoing block copolymer, and an aromatic vinyl-conjugated diene block copolymer having a particular constitution, at a specific proportion, and a tackifying resin is incorporated into this block copolymer composition, a hot-melt adhesive composition which has low melt viscosity at a relatively low temperature, has a long open time since the increase in melt viscosity concomitant with a decrease in temperature is mild, and has excellent tackiness or holding power after adhesion, is obtained. The present invention was finally completed based on this finding.

Thus, the present invention provides a block copolymer composition comprising a block copolymer P represented by the following general formula (P), a block copolymer Q represented by the following general formula (Q), and a block copolymer R represented by the following general formula (R), wherein a weight ratio (P/Q) of the block copolymer P and the block copolymer Q is 25/75 to 90/10, a weight ratio (R/(P+Q)) of the block copolymer R and a total weight of the block copolymer P and the block copolymer Q is 10/90 to 70/30, an aromatic vinyl monomer unit content of the block copolymer P is 41% by weight or greater, and a content of an aromatic vinyl monomer unit relative to all polymer components in the block copolymer composition is 15% to 80% by weight:

$$Ar1^p\text{-}D^p\text{-}Ar2^p \quad (P)$$

$$(Ar^q\text{-}D^q)_m\text{-}X^q \quad (Q)$$

$$Ar^r\text{-}D^r \quad (R),$$

in the general formulas (P), (Q) and (R), $Ar1^p$, $Ar^q$ and $Ar^r$ each represent an aromatic vinyl polymer block having a weight average molecular weight of 6,000 to 20,000; $Ar2^p$ represents an aromatic vinyl polymer block having a weight average molecular weight of 40,000 to 400,000; $D^p$, $D^q$ and $D^r$ each represent a conjugated diene polymer block having a vinyl bond content of 1 mol % to 20 mol %; $X^q$ represents a single bond, or a residue of a coupling agent; and m represents an integer of 2 or greater.

According to the present invention, there is obtained a block copolymer composition capable of producing a hot melt adhesive which can be easily applied at a relatively low temperature, has a long open time, and is excellent in holding power or tackiness.

Furthermore, the present invention provides a hot-melt adhesive composition, comprising the above-mentioned block copolymer composition and a tackifying resin.

Advantageous Effects of Invention

According to the present invention, a hot-melt adhesive composition which can be easily applied at a relatively low temperature, has a long open time, and has high holding power, is obtained.

DESCRIPTION OF EMBODIMENTS

The present invention relates to a block copolymer composition and a hot-melt adhesive composition using the block copolymer composition.

Hereinafter, the block copolymer composition and hot-melt adhesive composition of the present invention will be described.

A. Block Copolymer Composition

The block copolymer composition of the present invention is composed of at least three kinds of block copolymers such as block copolymers P to R that will be described in detail below. A block copolymer P that constitutes the block copolymer composition of the present invention is an aromatic vinyl-conjugated diene-aromatic vinyl block copolymer represented by the following general formula (P), which has two aromatic vinyl block polymer blocks having weight average molecular weights that are different from each other.

$$Ar1^p\text{-}D^p\text{-}Ar2^p \quad (P)$$

In the above general formula (P), $Ar1^p$ represents an aromatic vinyl polymer block having a weight average molecular weight of 6,000 to 20,000; $Ar2^p$ represents an aromatic vinyl polymer block having a weight average molecular weight of 40,000 to 400,000; and $D^p$ represents a conjugated diene polymer block having a vinyl bond content of 1 mol % to 20 mold.

A block copolymer Q that constitutes the block copolymer composition of the present invention is an aromatic vinyl-conjugated diene-aromatic vinyl block copolymer represented by the following general formula (Q).

$$(Ar^q\text{-}D^q)_m\text{-}X^q \quad (Q)$$

In the above general formula (Q), $Ar^q$ represents an aromatic vinyl polymer block having a weight average molecular weight of 6,000 to 20,000; $D^q$ represents a conjugated diene polymer block having a vinyl bond content of 1 mol % to 20 mol %; $X^q$ represents a single bond or a residue of a coupling agent; and m represents an integer of 2 or greater.

A block copolymer R that constitutes the block copolymer composition of the present invention is an aromatic vinyl-conjugated diene block copolymer represented by the following general formula (R).

$$Ar^r\text{-}D^r \quad (R)$$

In the above general formula (R), $Ar^r$ represents an aromatic vinyl polymer block having a weight average molecular weight of 6,000 to 20,000; and $D^r$ represents a conjugated diene polymer block having a vinyl bond content of 1 mol % to 20 mol %.

The aromatic vinyl polymer blocks ($Ar1^p$, $Ar2^p$, $Ar^q$ and $Ar^r$) of the block copolymers P to R are polymer blocks each constituted of an aromatic vinyl monomer unit. There are no particular limitations on the aromatic vinyl monomer that is used to constitute the aromatic vinyl monomer units of the aromatic vinyl polymer blocks as long as the aromatic vinyl monomer is an aromatic vinyl compound, but examples thereof include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, and vinylnaphthalene. Among these, it is preferable to use styrene. These aromatic vinyl monomers can be used singly or in combination of two or more kinds, in the respective aromatic vinyl polymer blocks. Furthermore, for the respective aromatic vinyl polymer blocks, an identical aromatic vinyl monomer may be used, or different aromatic vinyl monomers may be used.

The aromatic vinyl polymer blocks ($Ar1^p$, $Ar2^p$, $Ar^q$ and $Ar^r$) of the block copolymers P to R may respectively include a monomer unit other than the aromatic vinyl monomer unit. Examples of monomers that constitute the monomer unit other than the aromatic vinyl monomer unit, which can be included in the aromatic vinyl polymer blocks, include a conjugated diene monomer such as 1,3-butadiene or isoprene (2-methyl-1,3-butadiene), an α,β-unsaturated nitrile monomer, an unsaturated carboxylic acid or acid anhydride monomer, an unsaturated carboxylic acid ester monomer, and a non-conjugated diene monomer. The content of the monomer unit other than the aromatic vinyl monomer unit in the respective aromatic vinyl polymer blocks is preferably 20% by weight or less, and more preferably 10% by weight or less, and it is particularly preferable that the content be substantially 0% by weight.

The conjugated diene polymer blocks ($D^p$, $D^q$ and $D^r$) of the block copolymers P to R are polymer blocks each constituted of a conjugated diene monomer unit. There are no particular limitations on the conjugated diene that is used to constitute the conjugated diene monomer units of the conjugated diene polymer blocks as long as the conjugated diene is a conjugated diene compound, but examples include 1,3-butadiene, isoprene, 2,3-dimethyl-1,3-butadiene, 2-chloro-1,3-butadiene, 1,3-pentadiene, and 1,3-hexadiene. Among these, it is preferable to use 1,3-butadiene and/or isoprene, and it is particularly preferable to use isoprene. When the conjugated diene polymer blocks are constituted of an isoprene unit, a block copolymer composition resulting therefrom acquires high flexibility, and a hot-melt adhesive composition obtainable from the block copolymer composition acquires excellent adhesiveness and flexibility. These conjugated diene monomers can be used singly or in combination of two or more kinds, in the respective conjugated diene polymer blocks. Furthermore, for the respective conjugated diene polymer blocks, an identical conjugated diene monomer may be used, or different conjugated diene monomers may be used. In addition, a portion of the unsaturated bonds in the respective conjugated diene polymer blocks may be subjected to a hydrogenation reaction.

The conjugated diene polymer blocks ($D^p$, $D^q$ and $D^r$) of the block copolymers P to R may respectively include a monomer unit other than the conjugated diene monomer unit. Examples of monomers that constitute the monomer unit other than the conjugated diene monomer unit, which can be included in the conjugated diene polymer blocks, include an aromatic vinyl monomer such as styrene or α-methylstyrene, an α,β-unsaturated nitrile monomer, an unsaturated carboxylic acid or acid anhydride monomer, an unsaturated carboxylic acid ester monomer, and a non-conjugated diene monomer. The content of the monomer unit other than the conjugated diene monomer unit in the respective conjugated diene polymer blocks is preferably 20% by weight or less, and more preferably 10% by weight or less, and it is particularly preferable that the content be substantially 0% by weight.

The block copolymer P constituting the block copolymer composition is an asymmetric aromatic vinyl-conjugated diene-aromatic vinyl block copolymer composed of an aromatic vinyl polymer block ($Ar1^p$) having a relatively small weight average molecular weight, a conjugated diene polymer block (Dr) having a specific vinyl bond content, and an aromatic vinyl polymer block ($Ar2^p$) having a relatively large weight average molecular weight, linked in this order as represented by the general formula (P). The weight average molecular weight ($Mw(Ar1^p)$) of the aromatic vinyl polymer block ($Ar1^p$) having a relatively small weight average molecular weight is 6,000 to 20,000, preferably 7,000 to 18,000, and more preferably 8,000 to 16,000. If the value of $Mw(Ar1^p)$ is too small, there is a risk that the hot-melt adhesive composition obtainable by using the block copolymer composition may have low holding power. If the weight average molecular weight is too large, there is a risk that the hot-melt adhesive composition may have a markedly high melt viscosity. Furthermore, the weight average molecular weight ($Mw(Ar2^p)$) of the aromatic vinyl polymer block ($Ar2^p$) having a relatively large weight average molecular weight is 40,000 to 400,000, preferably 42,000 to 370,000, and more preferably 45,000 to 350,000. If the value of $Mw(Ar2^p)$ is too small, there is a risk that the hot-melt adhesive composition obtainable by using the block copolymer composition may have low holding power and a high melt viscosity at a relatively low temperature. On the other hand, a block copolymer P having an excessively large value of $Mw(Ar2^p)$ may be difficult to produce.

In the present invention, the weight average molecular weight of a polymer or a polymer block is a value determined by an analysis by high performance liquid chromatography, relative to polystyrene standards.

In the block copolymer P, there are no particular limitations on the ratio ($Mw(Ar2^p)/Mw(Ar1^p)$) of the weight average molecular weight ($Mw(Ar2^p)$) of the aromatic vinyl polymer block ($Ar2^p$) having a relatively large weight average molecular weight and the weight average molecular weight ($Mw(Ar1^p)$) of the aromatic vinyl polymer block ($Ar1^p$) having a relatively small weight average molecular weight, but the ratio is usually 2 to 67, preferably 3 to 40, and more preferably 4 to 35. When the block copolymer P is constructed as such, the hot-melt adhesive composition thus obtainable by using the block copolymer composition has a low melt viscosity at relatively low temperature, and acquires excellent appliability, with a long open time.

The vinyl bond content of the conjugated diene polymer block ($D^p$) of the block copolymer P (the content of 1,2-vinyl bonds and 3,4-vinyl bonds in all the conjugated diene monomer units) is 1 mol % to 20 mol %, preferably 2 mol % to 15 mol %, and more preferably 3 mol % to 10 mol %. If this vinyl bond content is too large, there is a risk that the block copolymer composition may become too hard, and the hot-melt adhesive composition obtainable by using the block copolymer composition may have poor adhesive force.

The weight average molecular weight ($Mw(D^p)$) of the conjugated diene polymer block ($D^p$) of the block copolymer P is not particularly limited, but is usually 20,000 to 200,000, preferably 35,000 to 150,000, and more preferably 45,000 to 100,000.

The content of the aromatic vinyl monomer units relative to all monomer units of the block copolymer P is required to be 41% by weight or greater, and is preferably 45 to 87% by weight, and more preferably 50 to 85% by weight. When the content of the aromatic vinyl monomer units relative to all monomer units of the block copolymer P falls in this range, the hot-melt adhesive composition thus obtainable acquires excellent holding power.

There are no particular limitations on the overall weight average molecular weight of the block copolymer P, but the weight average molecular weight is usually 70,000 to 500,000, preferably 80,000 to 470,000, and more preferably 90,000 to 450,000.

The block copolymer Q constituting the block copolymer composition of the present invention is a block copolymer in which two or more of diblock forms ($Ar^q$-$D^q$) each of which is composed of an aromatic vinyl polymer block ($Ar^q$) having a specific weight average molecular weight linked to a conjugated diene polymer block ($D^q$) having a specific vinyl bond content, are linked directly by a single bond or via a coupling agent residue, as represented by the general formula (Q). The weight average molecular weight ($Mw(Ar^q)$) of the aromatic vinyl polymer block ($Ar^q$) constituting the block copolymer Q is 6,000 to 200,000, preferably 7,000 to 18,000, and more preferably 8,000 to 16,000. If the value of $Mw(Ar^q)$ is too small, there is a risk that the hot-melt adhesive composition obtainable by using the block copolymer composition may have low holding power, and may have a low shear adhesion failure temperature and poor adhesive strength at high temperature. If the value of $Mw(Ar^q)$ is too large, there is a risk that the melt viscosity of the hot-melt adhesive composition may increase remarkably. If the weight average molecular weights ($Mw(Ar^q)$) of the aromatic vinyl polymer blocks that are present in a plural number in the block copolymer Q are in the range described above, the weight average molecular weights may be identical with or different from one another; however, it is preferable that the weight average molecular weights be substantially identical. Furthermore, it is more preferable that the weight average molecular weights ($Mw(Ar^q)$) of these aromatic vinyl polymer blocks be substantially identical with the weight average molecular weight ($Mw(Ar1^p)$) of the aromatic vinyl polymer block ($Ar1^p$) having a relatively small weight average molecular weight in the block copolymer P.

The vinyl bond content of the conjugated diene polymer block ($D^q$) of the block copolymer Q is 1 mol % to 20 mol %, preferably 2 mol % to 15 mol %, and more preferably 3 mol % to 10 mol %. If this vinyl bond content is too large, there is a risk that the block copolymer composition may become too hard, and a hot-melt adhesive composition obtainable by using the block copolymer composition may have poor adhesive force. Furthermore, it is preferable that the vinyl bond content of the conjugated diene polymer block ($D^q$) of the block copolymer Q be substantially identical with the vinyl bond content of the conjugated diene polymer block ($D^p$) of the block copolymer P.

The block copolymer Q is formed when diblock forms ($Ar^q$-$D^q$) that are each composed of an aromatic vinyl polymer block ($Ar^q$) linked to a conjugated diene polymer block ($D^q$), are linked directly by a single bond or via a coupling agent residue. Examples of the coupling agent that constitutes the coupling agent residue include those that will be described below. There are no particular limitations on the number of the diblock forms ($Ar^q$-$D^q$) linked (that is, m in the general formula (Q)), as long as the number is 2 or greater, and block copolymers Q in which the diblock forms are linked in different numbers may be present in mixture. Symbol m in the general formula (Q) is not particularly limited as long as it is an integer of 2 or greater, but m is usually an integer from 2 to 8, and preferably an integer from 2 to 4.

There are no particular limitations on the weight average molecular weight ($Mw(D^q)$) of the conjugated diene polymer block ($D^q$) of the block copolymer Q, but the weight average molecular weight is usually 20,000 to 200,000, preferably 35,000 to 150,000, and more preferably 45,000 to 100,000. It is preferable that the weight average molecular weight ($Mw(D^q)$) of the conjugated diene polymer block ($D^q$) of the block copolymer Q be substantially identical with the weight average molecular weight ($Mw(D^p)$) of the conjugated diene polymer block ($D^p$) of the block copolymer P. In addition, when an aromatic vinyl-conjugated diene-aromatic vinyl block copolymer produced without using a coupling agent is used as the block copolymer Q, the conjugated diene polymer blocks included in the block copolymer has all the monomer units directly linked together, and in reality, it cannot be said that this block copolymer is composed of two conjugated diene polymer blocks ($D^q$). However, in the present invention, even in the case of such conjugated diene polymer blocks, the block copolymer is conceptually regarded as a product in which two conjugated diene polymer blocks ($D^q$) having substantially identical weight average molecular weights are linked by a single bond. Therefore, for example, in the case of a block copolymer Q which is an aromatic vinyl-conjugated diene-aromatic vinyl block copolymer produced without using a coupling agent, when the conjugated diene polymer block has an overall weight average molecular weight of 100,000, the block copolymer is considered to have a $Mw(D^q)$ of 50,000.

There are no particular limitations on the content of the aromatic vinyl monomer unit to the overall monomer units of the block copolymer Q, but the content is usually 10% to 35% by weight, preferably 12% to 32% by weight, and more preferably 14% to 30% by weight. Also, there are no particular limitations on the overall weight average molecular weight of the block copolymer Q, but the overall weight average molecular weight, but the weight average molecular weight is usually 50,000 to 400,000, preferably 60,000 to 350,000, and even more preferably 70,000 to 300,000.

The block copolymer R constituting the block copolymer composition of the present invention is a block copolymer composed of an aromatic vinyl polymer block ($Ar^r$) having a specific weight average molecular weight linked to a conjugated diene polymer block ($D^r$) having a specific vinyl bond content, as represented by the general formula (R). The weight average molecular weight ($Mw(Ar^r)$) of the aromatic vinyl polymer block ($Ar^r$) constituting the block copolymer R is 6,000 to 20,000, preferably 7,000 to 18,000, and more preferably 8,000 to 16,000. If the value of $Mw(Ar^r)$ is too small, there is a risk that the hot-melt adhesive composition obtainable by using the block copolymer composition has low holding power, and may have a low shear adhesion failure temperature and poor adhesive strength at high temperature. If the value of $Mw(Ar^r)$ is too large, there is a risk that the melt viscosity of the hot-melt adhesive composition may increase remarkably. Furthermore, it is preferable that the weight average molecular weight ($Mw(Ar^r)$) of the aromatic vinyl polymer block ($Ar^r$) of the block copolymer R be substantially identical with at least one of the weight average molecular weight ($Mw(Ar1^p)$) of the aromatic vinyl polymer block ($Ar1^p$) having a relatively small weight average molecular weight in the block copolymer P and the weight average molecular weight ($Mw(Ar^q)$) of the aromatic vinyl polymer block ($Ar^q$) of the block copolymer Q. It is more preferable that the weight average molecular weight ($Mw(Ar^r)$) be substantially identical with both of these weight average molecular weights.

The vinyl bond content of the conjugated diene polymer block ($D^r$) of the block copolymer R is 1 mol % to 20 mol %, preferably 2 mol % to 15 mol %, and more preferably 3 mol % to 10 mol %. If this vinyl bond content is too large, there is a risk that the block copolymer composition may become too hard, and a hot-melt adhesive composition obtainable by using the block copolymer composition may have poor adhesive force. Furthermore, it is preferable that the vinyl bond content of the conjugated diene polymer block ($D^r$) of the block copolymer R be substantially identical with at least one of the vinyl bond content of the conjugated diene polymer block ($D^p$) of the block copolymer P and the vinyl bond content of the conjugated diene polymer block ($D^q$) of the block copolymer Q. It is more preferable that the vinyl bond content of the conjugated diene polymer block ($D^r$) be substantially identical with both of the vinyl bond contents of these conjugated diene polymer blocks.

There are no particular limitations on the weight average molecular weight ($Mw(D^r)$) of the conjugated diene polymer block ($D^r$) of the block copolymer R, but the weight average molecular weight is usually 20,000 to 200,000, preferably 35,000 to 150,000, and more preferably 45,000 to 100,000.

Furthermore, it is preferable that the weight average molecular weight (Mw(D$^r$)) of the conjugated diene polymer block (D$^r$) of the block copolymer R be substantially identical with at least one of the weight average molecular weight (Mw(D$^p$)) of the conjugated diene polymer block (D$^p$) of the block copolymer P and the weight average molecular weight (Mw (D$^q$)) of the conjugated diene polymer block (D$^q$) of the block copolymer Q. It is more preferable that the weight average molecular weight (Mw(D$^r$)) be substantially identical with both of these weight average molecular weights.

There are no particular limitations on the content of the aromatic vinyl monomer unit relative to the all monomer units of the block copolymer R, but the content is usually 10% to 35% by weight, preferably 12% to 32% by weight, and more preferably 14% to 30% by weight. Furthermore, it is preferable that the content of the aromatic vinyl monomer unit relative to all monomer units of the block copolymer R be substantially identical with the content of the aromatic vinyl monomer unit relative to all monomer units of the block copolymer Q. There are no particular limitations on the overall weight average molecular weight of the block copolymer R, but the overall weight average molecular weight is usually 25,000 to 200,000, preferably 45,000 to 175,000, and more preferably 55,000 to 150,000.

There are no particular limitations on the molecular weight distribution, which is expressed as the ratio (Mw/Mn) of the weight average molecular weight (Mw) and the number average molecular weight (Mn), of the respective polymer blocks constituting the block copolymers P to R that are the components of the block copolymer composition of the present invention, but the respective molecular weight distributions of the block copolymers are usually 1.1 or less, and preferably 1.05 or less.

The weight ratio (P/Q) of the block copolymer P and the block copolymer Q contained in the block copolymer composition of the present invention is 25/75 to 90/10, preferably 30/70 to 85/15, more preferably 36/64 to 80/20, and most preferably 38/62/to 75/25. When the block copolymer P and the block copolymer Q are included at these ratios, the hot-melt adhesive composition obtainable by using the block copolymer composition acquires low melt viscosity at relatively low temperature and excellent appliability, and has higher holding power after adhesion. On the other hand, if this ratio is too small, there is a risk that the melt viscosity of the adhesive composition at low temperature may increase, and if this ratio is too large, there is a risk that the adhesive composition may have poor holding power.

The amount of the block copolymer R contained in the block copolymer composition of the present invention as expressed as the weight ratio (R/(P+Q)) relative to the total weight of the block copolymer P and the block copolymer Q, is 10/90 to 70/30, preferably 15/85 to 68/32, and more preferably 20/80 to 65/35. When the block copolymer R is included at such a ratio, the hot-melt adhesive composition obtainable by using the block copolymer composition acquires excellent tackiness or adhesive force, and is well balanced between easy appliability at low temperature and holding power or adhesive strength at high temperature.

It is desirable that the block copolymer composition of the present invention is a composition containing only the block copolymers P to R as polymer components, but the block copolymer composition may contain a polymer component other than the block copolymers P to R. Examples of the polymer component other than the block copolymers P to R, which can be included in the block copolymer composition used in the present invention, include an aromatic vinyl-conjugated diene-aromatic vinyl block copolymer other than the block copolymer P and the block copolymer Q, an aromatic vinyl-conjugated diene block copolymer other than the block copolymer R, an aromatic vinyl homopolymer, a conjugated diene homopolymer, an aromatic vinyl-conjugated diene random copolymer, and branched polymers thereof; as well as thermoplastic elastomers such as a polyurethane-based thermoplastic elastomer, a polyamide-based thermoplastic elastomer, and a polyester-based thermoplastic elastomer; and thermoplastic resins such as polyethylene, polypropylene, polyvinyl chloride, an acrylonitrile-styrene copolymer, an acrylonitrile-butadiene-styrene copolymer, and polyphenylene ether. However, a tackifying resin and a softening agent that will be described later will be distinguished from the polymer components constituting this block copolymer composition. In the block copolymer composition of the present invention, the content of the polymer component other than the block copolymers P to R is preferably 20% by weight or less, and more preferably 10% by weight or less, relative to all the polymer components.

In the block copolymer composition of the invention, the content of the aromatic vinyl monomer units (in the following descriptions, may be referred to as a total aromatic vinyl monomer unit content) relative to the all monomer units constituting the polymer components in the block copolymer composition is 15% to 80% by weight, preferably 18% to 70% by weight, more preferably 20% to 60% by weight, and most preferably 22% to 50% by weight. If the total aromatic vinyl monomer unit content is too small, there is a risk that the hot-melt adhesive composition obtainable by using the block copolymer composition may have poor holding power. If the total aromatic vinyl monomer unit content is too large, there is a risk that the block copolymer composition may become too hard, and the hot-melt adhesive composition obtainable by using the block copolymer composition may have poor adhesive force. This total aromatic vinyl monomer unit content can be easily regulated by regulating the amounts of incorporation of the respective aromatic vinyl monomer units of the block copolymers P to R and the polymer component other than these, which constitute the block copolymer composition, while considering the contents of the aromatic vinyl monomer units in the block copolymers. Furthermore, in case where all the polymer components that constitute the block copolymer composition are composed of aromatic vinyl monomer units and conjugated diene monomer units only, when the polymer components of the block copolymer composition are subjected to ozone decomposition and then to reduction with lithium aluminum hydride according to the method described in Rubber Chem. Technol., 45, 1295 (1972), the conjugated diene monomer unit portion is decomposed, and only the aromatic vinyl monomer unit portion can be extracted. Therefore, the total aromatic vinyl monomer unit content can be easily measured.

There are no particular limitations on the overall weight average molecular weight of the polymer components constituting the block copolymer composition of the present invention, but the overall weight average molecular weight is usually 50,000 to 500,000, preferably 60,000 to 450,000, and more preferably 70,000 to 400,000. Furthermore, there are no particular limitations on the molecular weight distribution, which is expressed as the ratio (Mw/Mn) of the weight average molecular weight (Mw) and the number average molecular weight (Mn) of the entire polymer components constituting the block copolymer composition of the present invention, but the molecular weight distribution is usually 1.01 to 10, preferably 1.03 to 5, and more preferably 1.05 to 3.

There are no particular limitations on the method of obtaining the block copolymer composition of the present invention. For example, the block copolymer composition can be produced by separately producing each of the block copolymers P to R according to conventional methods for producing block copolymers, incorporating other polymer components and the like according to necessity, and then mixing the components according to a conventional method such as kneading or solution mixing. However, from the viewpoint of obtaining a block copolymer composition having a particularly preferred constitution with higher productivity, the method for producing the block copolymer composition that will be described below is suitable.

That is, the block copolymer composition of the present invention is preferably produced by using a production method which comprises the following steps (6) to (10).

(6): A step of polymerizing an aromatic vinyl monomer using a polymerization initiator in a solvent.

(7): A step of adding a conjugated diene monomer to the solution containing an aromatic vinyl polymer having an active terminal, which is obtained in the step (6).

(8): A step of adding a coupling agent and a polymerization terminator to the solution containing the aromatic vinyl-conjugated diene block copolymer having an active terminal, which is obtained in the step (7), in an amount such that the total amount of the functional groups of the coupling agent and the polymerization terminator relative to the active terminal of the aromatic vinyl-conjugated diene block copolymer having an active terminal is less than 1 molar equivalent, and thereby forming a block copolymer Q and a block copolymer R.

(9): A step of adding an aromatic vinyl monomer to the solution that is obtained in the step (8), and thereby forming a block copolymer P.

(10): A step of collecting the block copolymer composition from the solution that is obtained in the step (9).

In the method for producing the block copolymer composition described above, first, an aromatic vinyl monomer is polymerized by using a polymerization initiator in a solvent (Step (6)). Examples of the polymerization initiator that may be used include an organic alkali metal compound, an organic alkaline earth metal compound, and an organic lanthanoid series rare earth metal compound, which are generally known to have an anionic polymerization activity toward aromatic vinyl monomers and conjugated diene monomers. As the organic alkali metal compound, an organolithium compound having one or more lithium atoms in the molecule is particularly suitably used, and specific examples thereof include organic monolithium compounds such as ethyllithium, n-propyllithium, isopropyllithium, n-butyllithium, sec-butyllithium, t-butyllithium, hexyllithium, phenyllithium, stilbene lithium, dialkylaminolithium, diphenylaminolithium, and ditrimethylsilylaminolithium; organic dilithium compounds such as methylenedilithium, tetramethylenedilithium, hexamethylenedilithium, isoprenyldilithium, and 1,4-dilithioethylcyclohexane; and organic trilithium compounds such as 1,3,5-trilithiobenzene. Among these, organic monolithium compounds are particularly suitably used.

Examples of the organic alkaline earth metal compound that is used as a polymerization initiator include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate, and ethylbarium. Furthermore, specific examples of other polymerization initiators include compounds which form a homogeneous system in an organic solvent and have living polymerizability, such as a composite catalyst formed from a lanthanoid series rare earth metal compound containing neodymium, samarium, gadolinium or the like/alkylaluminum/alkylaluminum halide/alkylaluminum hydride, and a metallocene type catalyst containing titanium, vanadium, samarium, gadolinium or the like. These polymerization initiators may be used singly, or as mixtures of two or more kinds.

The amount of use of the polymerization initiator may be determined in accordance with the intended molecular weight of each block copolymer and is not particularly limited. However, the amount of use is usually 0.01 to 20 millimoles, preferably 0.05 to 15 millimoles, and more preferably 0.1 to 10 millimoles, per 100 g of the total amount of monomers used.

There are no particular limitations on the solvent used in the polymerization as long as the solvent is inert to the polymerization initiator, and for example, a linear hydrocarbon solvent, a cyclic hydrocarbon solvent, or a solvent mixture thereof is used. Examples of the linear hydrocarbon solvent include linear alkanes and alkenes having 4 to 6 carbon atoms, such as n-butane, isobutene, 1-butene, isobutylene, trans-2-butene, cis-2-butene, 1-pentene, trans-2-pentene, cis-2-pentene, n-pentane, isopentane, neopentane, and n-hexane. Specific examples of the cyclic hydrocarbon solvent include aromatic compounds such as benzene, toluene and xylene; and alicyclic hydrocarbon compounds such as cyclopentane and cyclohexane. These solvents may be used singly, or as mixtures of two or more kinds.

There are no particular limitations on the amount of the solvent used in the polymerization, but the amount is set such that the total concentration of the block copolymers in the solution after the polymerization reaction is usually 5% to 60% by weight, preferably 10% to 55% by weight, and more preferably 20% to 50% by weight.

Upon the preparation of the block copolymer composition, a Lewis base compound may be added to the reactor used in the polymerization, in order to control the structures of the various polymer blocks of the respective block copolymers. Examples of this Lewis base compound include ethers such as tetrahydrofuran, diethyl ether, dioxane, ethylene glycol dimethyl ether, ethylene glycol dibutyl ether, diethylene glycol dimethyl ether, and diethylene glycol dibutyl ether; tertiary amines such as tetramethylethylenediamine, trimethylamine, triethylamine, pyridine, and quinuclidine; alkali metal alkoxides such as potassium t-amyloxide and potassium t-butyloxide; and phosphines such as triphenylphosphine. These Lewis base compounds are used singly or in combination of two or more kinds, and are appropriately selected to the extent of not impairing the purposes of the present invention.

Furthermore, the timing for adding the Lewis base compound during the polymerization reaction is not particularly limited and may be appropriately determined in accordance with the structures of the respective intended block copolymers. For example, the Lewis base compound may be added in advance before initiation of the polymerization, or may be added after the polymerization of a portion of the polymer blocks. It is also acceptable to add the Lewis base compound in advance before initiation of the polymerization and then to further add the Lewis base compound after the polymerization of a portion of the polymer blocks.

The polymerization reaction temperature is usually 10° C. to 150° C., preferably 30° C. to 130° C., and more preferably 40° C. to 90° C. The time required for the polymerization may vary with the conditions, but the time is usually within 48 hours, and preferably 0.5 to 10 hours. The polymerization pressure may be set in a pressure range sufficient to maintain the monomers and the solvent in the liquid state in the polymerization temperature range, and there are no particular limitations on the pressure.

When an aromatic vinyl monomer is polymerized under the conditions such as described above using a polymerization initiator in a solvent, a solution containing an aromatic vinyl polymer having an active terminal can be obtained. This aromatic vinyl polymer having an active terminal will constitute the aromatic vinyl polymer block ($Ar1^p$) having a relatively small weight average molecular weight of the block copolymer P, the aromatic vinyl polymer block ($Ar^q$) of the block copolymer Q, and the aromatic vinyl polymer block ($Ar^r$) of the block copolymer R, which are the constituents of the block copolymer composition. Therefore, the amount of the aromatic vinyl monomers used at this time is determined in accordance with the intended weight average molecular weights of these polymer blocks.

The next step is a step of adding a conjugated diene monomer to the solution containing this aromatic vinyl polymer having an active terminal, which is obtained as described above (Step (7)). The addition of this conjugated diene monomer leads to the formation of a conjugated diene polymer chain starting from the active terminal, and thus a solution containing an aromatic vinyl-conjugated diene block copolymer having an active terminal is obtained. The amount of the conjugated diene monomer used at this time is determined such that the conjugated diene polymer chain thus obtained has the weight average molecular weights of the intended conjugated diene polymer block ($D^q$) of the block copolymer Q and the intended conjugated diene polymer block ($D^r$) of the block copolymer R.

In the subsequent step, a coupling agent and a polymerization terminator are added to the solution containing the aromatic vinyl-conjugated diene block copolymer having an active terminal, which is obtained as described above, in an amount such that the total amount of the functional groups of the coupling agent and the polymerization terminator relative to the active terminal of the aromatic vinyl-conjugated diene block copolymer having an active terminal, is less than 1 molar equivalent (Step (8)).

There are no particular limitations on the coupling agent that is added in this step, and any bi- or higher-functional coupling agent can be used. Examples of a bifunctional coupling agent include bifunctional halogenated silanes such as dichlorosilane, monomethyldichlorosilane, and dimethyldichlorosilane; bifunctional alkoxysilanes such as diphenyldimethoxysilane, and diphenyldiethoxysilane; bifunctional halogenated alkanes such as dichloroethane, dibromoethane, methylene chloride, and dibromomethane; bifunctional halogenated tin compounds such as dichlorotin, monomethyldichlorotin, dimethyldichlorotin, monoethyldichlorotin, diethyldichlorotin, monobutyldichlorotin, and dibutyldichlorotin; dibromobenzene, benzoic acid, CO, and 2-chloropropene. Examples of a trifunctional coupling agent include trifunctional halogenated alkanes such as trichloroethane and trichloropropane; trifunctional halogenated silanes such as methyltrichlorosilane and ethyltrichlorosilane; and trifunctional alkoxysilanes such as methyltrimethoxysilane, phenyltrimethoxysilane, and phenyltriethoxysilane. Examples of a tetrafunctional coupling agent include tetrafunctional halogenated alkanes such as carbon tetrachloride, carbon tetrabromide, and tetrachloroethane; tetrafunctional halogenated silanes such as tetrachlorosilane and tetrabromosilane; tetrafunctional alkoxysilanes such as tetramethoxysilane and tetraethoxysilane; and tetrafunctional halogenated tin compounds such as tetrachlorotin and tetrabromotin. Examples of a penta- or higher-functional coupling agent include 1,1,1,2,2-pentachloroethane, perchloroethane, pentachlorobenzene, perchlorobenzene, octabromodiphenyl ether, and decabromodiphenyl ether. These coupling agents may be used singly, or two or more kinds can be used in combination.

There are no particular limitations also on the polymerization terminator in this step, and conventionally known polymerization terminators can be used without particular limitations. Examples of polymerization terminators that are particularly suitably used include alcohols such as methanol, ethanol, propanol, butanol, and isopropanol.

When a coupling agent is added to the solution containing the aromatic vinyl-conjugated diene block copolymer having an active terminal, a conjugated diene polymer block of the aromatic vinyl-conjugated diene block copolymer having an active terminal is linked to another such conjugated diene polymer block via the residue of the coupling agent. As a result, the block copolymer Q of the block copolymer composition is formed. Furthermore, when a polymerization terminator is also added to this solution, the active terminal of the aromatic vinyl-conjugated diene block copolymer having an active terminal is deactivated, and as a result, the block copolymer R of the block copolymer composition is formed. Here, there are no particular limitations on the order of adding the coupling agent and the polymerization terminator, and any one of them may be added first, followed by addition of the other, or both of them may be added at the same time.

The amounts of the coupling agent and the polymerization terminator that are added in this step are needed to be adjusted such that the total amount of the functional groups of those agents relative to the active terminal of the aromatic vinyl-conjugated diene block copolymer having an active terminal is less than 1 molar equivalent. This is because there is a need to have a portion of the aromatic vinyl-conjugated diene block copolymer having an active terminal left in the solution, in order to carry out the step of forming the block copolymer P, which is the subsequent step. The amounts of the coupling agent and the polymerization terminator are preferably such that the total amount of the functional groups of those agents relative to the active terminal of the polymer is in the range of 0.10 to 0.90 molar equivalents, and more preferably in the range of 0.15 to 0.70 molar equivalents. Furthermore, since the amount of the coupling agent that is added in this step is a determining factor of the amount of the block copolymer Q in the resulting block copolymer composition, and since the amount of the reaction terminator is a determining factor of the amount of the block copolymer R in the block copolymer composition, the respective amounts may be determined in accordance with the intended composition of the block copolymer composition.

There are no particular limitations on the reaction conditions for the coupling reaction or the polymerization termination reaction, and generally, the reaction conditions may be set up in the same scope as that of the polymerization reaction conditions described above.

In the next step, an aromatic vinyl monomer is added to the solution obtained as described above (Step (9)). When an aromatic vinyl monomer is added to the solution, an aromatic vinyl polymer chain is formed from the terminal of the aromatic vinyl-conjugated diene block copolymer having an active terminal, which is left unreacted with the coupling agent or the polymerization terminator. This aromatic vinyl polymer chain will constitute the aromatic vinyl polymer block ($Ar2^p$) having a relatively large weight average molecular weight of the block copolymer P, which constitutes the block copolymer composition. Therefore, the amount of the aromatic vinyl monomer used at this time is determined in accordance with the intended weight average molecular weight of the aromatic vinyl polymer block ($Ar2^p$). This step of adding an aromatic vinyl monomer leads to the formation of an asymmetric aromatic vinyl-conjugated diene-aromatic vinyl block copolymer which constitutes the block copolymer P, and as a result, a solution containing the block copolymers P to R is obtained. In addition, it is also acceptable to add a conjugated diene monomer to the solution containing the aromatic vinyl-conjugated diene block copolymer having an active terminal, which is left unreacted with the coupling agent or the polymerization terminator, before this step of adding an aromatic vinyl monomer. When a conjugated diene monomer is added as such, the weight average molecular weight of the conjugated diene polymer block ($D^p$) of the block copolymer P can be made larger as compared with the case where the conjugated diene monomer is not added.

In the next step, the intended block copolymer composition is collected from the solution containing the block copolymers P to R, which is obtained as described above (Step (10)). The method of collection may be carried out according to a conventional method, and is not particularly limited. For example, the block copolymer composition can be collected by adding, if necessary, a polymerization terminator such as water, methanol, ethanol, propanol, hydrochloric acid or citric acid after completion of the reaction, further adding additives such as an antioxidant as necessary, and then applying a known method such as a direct drying method or a steam stripping method to the solution. In case where the block copolymer composition is collected in the form of slurry by applying steam stripping or the like, the slurry is dehydrated using any dehydrator such as an extruder type squeezer to produce crumb having a water content chat is equal to or less than a predetermined value. The crumb may be further dried using any dryer such as a band dryer or an expansion-extrusion dryer. The block copolymer composition obtainable as described above may be processed into a pellet form or the like according to a conventional method and then used for producing a hot-melt adhesive composition or the like.

According to the production method described above, since the block copolymers P to R can all be continuously obtained in a same reaction vessel, the target block copolymer composition can be obtained with superior productivity as compared with the case of individually producing the respective block copolymers and mixing them. Furthermore, in regard to the resulting block copolymer composition, since the various polymer blocks of the respective block copolymers have weight average molecular weights that are balanced in a particularly desirable manner in view of the block copolymer composition of the present invention, there is obtained a hot-melt adhesive composition which is excellent in appliability, and is very well balanced between holding power and the adhesive force.

There are no particular limitations on the use of the block copolymer composition of the present invention, and the block copolymer composition can be used in the conventional applications where aromatic vinyl-conjugated diene-aromatic vinyl block copolymers are used, for example, in the applications for molding materials that are used in elastic films, gloves, elastic bands, condoms, various rolls for office appliances and office machinery, vibration-proofing sheets for electric and electronic instruments, vibration-proofing rubber, shock-absorbing sheets, impact buffer films/sheets, residential damping sheets, vibration damper materials, and the like; in the applications for adhesives that are used in adhesive tapes, adhesive sheets, adhesive labels, dust-catching rollers and the like; in the applications for adhesives that are used in hygiene products or bookbinding; and in the applications for elastic fibers that are used in clothes, sports goods and the like. The block copolymer composition of the present invention is highly well balanced between a high elastic modulus and a small permanent set, and even in the case where the block copolymer composition is subjected to a molding method which is likely to cause molecular orientation, such as extrusion molding, a highly isotropic molded product having uniform mechanical properties can be obtained. Therefore, the block copolymer composition of the present invention is suitably used as a material for elastic films that are used in hygiene products such as paper diapers and sanitary products.

Among these applications, the block copolymer composition of the present invention is particularly suitably used to constitute the hot-melt adhesive composition of the present invention that will be described below.

B. Hot-Melt Adhesive Composition

The hot-melt adhesive composition of the present invention is an adhesive composition containing a tackifying resin, but the hot-melt adhesive composition can be divided into an embodiment containing a block copolymer composition formed from at least two kinds of block copolymers (first embodiment) and an embodiment containing the block copolymer composition described above (second embodiment). Hereafter, the hot-melt adhesive composition of the present invention will be described according to the respective embodiments.

1. First embodiment

First, the first embodiment of the hot-melt adhesive composition of the present invention will be described. The hot-melt adhesive composition of the current embodiment comprises a block copolymer composition formed from at least two kinds of block copolymers, and a tackifying resin.

A block copolymer A, which is one of the two kinds of the block copolymers constituting the block copolymer composition used in the current embodiment, is an aromatic vinyl-conjugated diene-aromatic vinyl block copolymer represented by the following general formula (A), which has two aromatic vinyl polymer blocks having weight average molecular weights that are different from each other.

$$Ar1^a\text{-}D^a\text{-}Ar2^a \tag{A}$$

In the general formula (A), $Ar1^a$ represents an aromatic vinyl polymer block having a weight average molecular weight of 6,000 to 15,000; $Ar2^a$ represents an aromatic vinyl polymer block having a weight average molecular weight of 40,000 to 400,000; and $D^a$ represents a conjugated diene polymer block having a vinyl bond content of 1 mol % to 20 mol %.

Furthermore, a block copolymer B, which is one of the two kinds of block copolymers constituting the block copolymer composition of the current embodiment, is an aromatic vinyl-conjugated diene-aromatic vinyl block copolymer represented by the following general formula (B).

$$(Ar^b\text{-}D^b)_n\text{-}X \tag{B}$$

In the general formula (B), $Ar^b$ represents an aromatic vinyl polymer block having a weight average molecular weight of 6,000 to 15,000; $D^b$ represents a conjugated diene polymer block having a vinyl bond content of 1 mol % to 20 mol %; X represents a single bond or a residue of a coupling agent; and n represents an integer of 2 or greater.

The aromatic vinyl polymer blocks ($Ar1^a$, $Ar2^a$ and $Ar^b$) of the block copolymer A and the block copolymer B are polymer blocks each composed of an aromatic vinyl monomer unit. Examples of aromatic vinyl monomers that can be used to constitute the aromatic vinyl monomer units of the aromatic vinyl polymer blocks include the same aromatic vinyl monomers as those described in the section "A. Block copolymer composition".

The aromatic vinyl polymer blocks ($Ar1^a$, $Ar2^a$, and $Ar^b$) of the block copolymer A and the block copolymer B may respectively include a monomer unit other than the aromatic vinyl monomer unit. Examples of monomers that constitute the monomer unit other than the aromatic vinyl monomer unit, which can be included in the aromatic vinyl polymer blocks, and the content of the monomers, are defined to be the same as those described in the section "A. Block copolymer composition".

The conjugated diene polymer blocks ($D^a$ and $D^b$) of the block copolymer A and the block copolymer B are polymer blocks each constituted of a conjugated diene monomer unit. Examples of conjugated dienes and conjugated diene monomers that are used to constitute the conjugated diene monomer units of the conjugated diene polymer blocks include the same conjugated dienes and conjugated diene monomers as those described in the section "A. Block copolymer composition".

The conjugated diene polymer blocks ($D^a$ and $D^b$) of the block copolymer A and the block copolymer B may respectively include a monomer unit other than the conjugated diene monomer unit. Examples of monomers that constitute the monomer unit other than the conjugated diene monomer unit, which can be included in the conjugated diene polymer blocks, and the content of the monomers, are defined to be the same as those described in the section "A. Block copolymer composition".

The block copolymer A constituting the block copolymer composition is an asymmetric aromatic vinyl-conjugated diene-aromatic vinyl block copolymer composed of an aromatic vinyl polymer block ($Ar1^a$) having a relatively small weight average molecular weight, a conjugated diene polymer block ($D^a$) having a specific vinyl bond content, and an aromatic vinyl polymer block ($Ar2^a$) having a relatively large weight average molecular weight, linked in this order as represented by the general formula (A). The weight average molecular weight ($Mw(Ar1^a)$) of the aromatic vinyl polymer block ($Ar1^a$) having a relatively small weight average molecular weight is 6,000 to 15,000, preferably 7,000 to 14,000, and more preferably 8,000 to 13,000. If the value of $Mw(Ar1^a)$ is too small, there is a risk that the resulting hot-melt adhesive composition may have low holding power. If the value of $Mw(Ar1^a)$ is too large, there is a risk that the melt viscosity of the hot-melt adhesive composition may increase remarkably. Furthermore, the weight average molecular weight ($Mw(Ar2^a)$) of the aromatic vinyl polymer block ($Ar2^a$) having a relatively large weight average molecular weight is 40,000 to 400,000, preferably 42,000 to 370,000, and more preferably 45,000 to 350,000. If the value of $Mw(Ar2^a)$ is too small, there is a risk that the resulting hot-melt adhesive composition may have low holding power and also have a high melt viscosity at a relatively low temperature. On the other hand, a block copolymer A having an excessively large value of $Mw(Ar2^a)$ may be difficult to produce.

In the current embodiment, the weight average molecular weight of a polymer or a polymer block is a value determined by an analysis by high performance liquid chromatography, relative to polystyrene standards.

In the block copolymer A, there are no particular limitations on the ratio ($Mw(Ar2^a)/Mw(Ar1^a)$) of the weight average molecular weight ($Mw(Ar2^a)$) of the aromatic vinyl polymer block ($Ar2^a$) having a relatively large weight average molecular weight and the weight average molecular weight ($Mw(Ar1^a)$) of the aromatic vinyl polymer block ($Ar1^a$) having a relatively small weight average molecular weight, but the ratio is usually 2.6 to 67, preferably 4 to 40, and more preferably 4.5 to 35. When the block copolymer A is constructed as such, the resulting hot-melt adhesive composition acquires a low melt viscosity at a relatively low temperature, and has a long open time and excellent appliability.

The vinyl bond content of the conjugated diene polymer block ($D^a$) of the block copolymer A is defined to be the same as that for the conjugated diene polymer block ($D^p$) of the block copolymer P described in the section "A. Block copolymer composition".

The weight average molecular weight ($Mw(D^a)$) of the conjugated diene polymer block ($D^a$) of the block copolymer A is not particularly limited, but is usually 20,000 to 200,000, preferably 30,000 to 150,000, and more preferably 35,000 to 100,000.

The content of the aromatic vinyl monomer units relative to the all monomer units of the block copolymer A is defined to be the same as those for the block copolymer P described in the section "A. Block copolymer composition".

The overall weight average molecular weight of the block copolymer A is defined to be the same as those for the block copolymer P described in the section "A. Block copolymer composition".

The block copolymer B constituting the block copolymer composition used in the current embodiment is a block copolymer in which two or more of diblock forms ($Ar^b$-$D^b$), each of which is composed of an aromatic vinyl polymer block ($Ar^b$) having a specific weight average molecular weight linked to a conjugated diene polymer block ($D^b$) having a specific vinyl bond content, are linked directly by a single bond or via a coupling agent residue, as represented by the general formula (B). The weight average molecular weights ($Mw(Ar^b)$) of the aromatic vinyl polymer blocks ($Ar^b$) constituting the block copolymer B are each 6,000 to 15,000, preferably 7,000 to 14,000, and more preferably 8,000 to 13,000. If the value of $Mw(Ar^b)$ is too small, there is a risk that the resulting hot-melt adhesive composition may have low holding power. If the value of $Mw(Ar^b)$ is too large, there is a risk that the melt viscosity of the hot-melt adhesive composition may increase remarkably. If the weight average molecular weights ($Mw(Ar^b)$) of the plural aromatic vinyl polymer blocks that are present in the block copolymer B are in the range described above, the weight average molecular weights may be identical with or different from one another; however, it is preferable that the weight average molecular weights be substantially identical. Furthermore, it is more preferable that the weight average molecular weights ($Mw(Ar^b)$) of these aromatic vinyl polymer blocks be substantially identical with the weight average molecular weight ($Mw(Ar1^a)$) of the aromatic vinyl polymer block ($Ar1^a$) having a relatively small weight average molecular weight in the block copolymer A.

The vinyl bond content of the conjugated diene polymer block ($D^b$) of the block copolymer B is defined to be the same as that of the conjugated diene polymer block ($D^q$) of the block copolymer Q described in the section "A. Block copolymer composition". Furthermore, it is preferable that the vinyl bond content of the conjugated diene polymer block ($D^b$) of the block copolymer B be substantially identical with the vinyl bond content of the conjugated diene polymer block ($D^a$) of the block copolymer A.

The block copolymer B is a block copolymer in which diblock forms ($Ar^b$-$D^b$), each of which is composed of an aromatic vinyl polymer block ($Ar^b$) linked to a conjugated diene polymer block ($D^b$), are linked directly by a single bond or via a coupling agent residue. Examples of the coupling agent that constitutes the coupling agent residue include those listed in the section "A. Block copolymer composition". The number of the diblock forms ($Ar^b$-$D^b$) linked together (that is, n in the general formula (B)) is defined to be the same as m described in the section "A. Block copolymer composition".

There are no particular limitations on the weight average molecular weight (Mw($D^b$)) of the conjugated diene polymer block ($D^b$) of the block copolymer B, but the weight average molecular weight is usually 20,000 to 200,000, preferably 30,000 to 150,000, and more preferably 35,000 to 100,000. Furthermore, it is preferable that the weight average molecular weight (Mw($D^b$)) of the conjugated diene polymer block ($D^b$) of the block copolymer B be substantially identical with the weight average molecular weight (Mw($D^a$)) of the conjugated diene polymer block ($D^a$) of the block copolymer A. When an aromatic vinyl-conjugated diene-aromatic vinyl block copolymer produced without using a coupling agent is used as the block copolymer B, the conjugated diene polymer blocks included in the block copolymer has all the monomer units directly linked together, and in reality, it cannot be said that this block copolymer is composed of two conjugated diene polymer blocks ($D^b$). However, in the current embodiment, even in the case of such conjugated diene polymer blocks, the block copolymer is conceptually regarded as a product in which two conjugated diene polymer blocks ($D^b$) having substantially identical weight average molecular weights are linked by a single bond. Therefore, for example, in the case of a block copolymer B which is an aromatic vinyl-conjugated diene-aromatic vinyl block copolymer produced without using a coupling agent, when the conjugated diene polymer block has an overall weight average molecular weight of 100,000, the block copolymer is considered to have the Mw($D^b$) of 50,000.

There are no particular limitations on the content of the aromatic vinyl monomer unit relative to the all monomer units of the block copolymer B, but the content is usually 10% to 35% by weight, preferably 12% to 32% by weight, and more preferably 15% to 30% by weight. Furthermore, the overall weight average molecular weight of the block copolymer B is also not particularly limited, but the overall weight average molecular weight is usually 50,000 to 400,000, preferably 60,000 to 350,000, and more preferably 70,000 to 300,000.

There are no particular limitations on the molecular weight distribution, which is expressed as the ratio (Mw/Mn) of the weight average molecular weight (Mw) and the number average molecular weight (Mn), of the respective polymer blocks constituting the block copolymer A and the block copolymer B that constitute the block copolymer composition used in the current embodiment, but the molecular weight distribution is usually 1.1 or less, and preferably 1.05 or less.

The weight ratio (A/B) of the block copolymer A and the block copolymer B that are contained in the block copolymer composition used in the current embodiment, is defined to be the same as the weight ratio (P/Q) of the block copolymer P and the block copolymer Q described in the section "A. Block copolymer composition".

The block copolymer composition used in the current embodiment is desirably a composition containing only the block copolymer A and the block copolymer B as the polymer components, but may be a composition containing a polymer component other than the block copolymer A and the block copolymer B. Examples of the polymer component other than the block copolymer A and the block copolymer B, which can be included in the block copolymer composition used in the current embodiment, include an aromatic vinyl-conjugated diene-aromatic vinyl block copolymer other than the block copolymer A and the block copolymer B, an aromatic vinyl-conjugated diene block copolymer, an aromatic vinyl homopolymer, a conjugated diene homopolymer, an aromatic vinyl-conjugated diene random copolymer, and branched polymers thereof; as well as thermoplastic elastomers such as a polyurethane-based thermoplastic elastomer, a polyamide-based thermoplastic elastomer, and a polyester-based thermoplastic elastomer; and thermoplastic resins such as polyethylene, polypropylene, polyvinyl chloride, an acrylonitrile-styrene copolymer, an acrylonitrile-butadiene-styrene copolymer, and polyphenylene ether. However, a tackifying resin and a softening agent that will be described later will be distinguished from the polymer components constituting this block copolymer composition. In the block copolymer composition used in the current embodiment, the content of the polymer component other than the block copolymer A and the block copolymer B is preferably 20% by weight or less, and more preferably 10% by weight or less, relative to the all polymer components.

In the block copolymer composition used in the current embodiment, the content of the aromatic vinyl monomer units (in the following descriptions, may be referred to as a total aromatic vinyl monomer unit content) relative to all monomer units constituting the polymer components included in the block copolymer composition, is 20% to 70% by weight, preferably 22% to 60% by weight, and more preferably 25% to 50% by weight. If the total aromatic vinyl monomer unit content is too small, there is a risk that the resulting hot-melt adhesive composition may have poor holding power, and if the total aromatic vinyl monomer unit content is too large, the resulting hot-melt adhesive composition becomes too hard, and there is a risk that the hot-melt adhesive composition may have poor adhesive force. This total aromatic vinyl monomer unit content can be easily regulated by regulating the amounts of incorporation of the respective aromatic vinyl monomer units of the block copolymer A, the block copolymer B and the polymer component other than these, which constitute the block copolymer composition, while considering the contents of the aromatic vinyl monomer units in the block copolymers.

There are no particular limitations on the overall weight average molecular weight of the polymer components constituting the block copolymer composition used in the current embodiment, but the overall weight average molecular weight is usually 50,000 to 500,000, preferably 60,000 to 450,000, and more preferably 70,000 to 400,000. Furthermore, there are no particular limitations on the molecular weight distribution, which is expressed as the ratio (Mw/Mn) of the weight average molecular weight (Mw) and the number average molecular weight (Mn) of the entire polymer components constituting the block copolymer composition of the present embodiment, but the molecular weight distribution is usually 1.01 to 10, preferably 1.03 to 5, and more preferably 1.05 to 3.

There are no particular limitations on the method of obtaining the block copolymer composition used in the current embodiment. For example, the block copolymer composition can be produced by separately producing a block copolymer A and a block copolymer B according to conventional methods for producing block copolymers, incorporating other polymer components and the like according to necessity, and then mixing the components according to a conventional method such as kneading or solution mixing. However, from the viewpoint of obtaining a block copolymer composition having a particularly preferred constitution with higher productivity, the production method that will be described below is suitable.

That is, it is preferable to produce the block copolymer composition used in the current embodiment by using a production method which comprises the following steps (1) to (5).

(1): A step of polymerizing an aromatic vinyl monomer using a polymerization initiator in a solvent.

(2): A step of adding a conjugated diene monomer to the solution containing an aromatic vinyl polymer having an active terminal, which is obtained in the step (1).

(3): A step of adding a coupling agent to the solution containing the aromatic vinyl-conjugated diene block copolymer having an active terminal, which is obtained in the step (2), in an amount such that the amount of the functional groups of the coupling agent relative to the active terminal is less than 1 molar equivalent, and thereby forming a block copolymer B.

(4): A step of adding an aromatic vinyl monomer to the solution that is obtained in the step (3), and thereby forming a block copolymer A.

(5): A step of collecting the block copolymer composition from the solution that is obtained in the step (4).

In the method for producing the block copolymer composition as described above, first, an aromatic vinyl monomer is polymerized by using a polymerization initiator in a solvent. The polymerization initiator to be used, the amount of use thereof, the solvent to be used in the polymerization, and the amount of the solvent are defined to be the same as those described in the section "A. Block copolymer composition".

When the block copolymer composition is obtained, a Lewis base compound may be added to the reactor that is used for the polymerization, in order to control the structures of the various polymer blocks of the respective block copolymers. This Lewis base compound and the timing for addition thereof are defined to be the same as those described in the section "A. Block copolymer composition".

The polymerization reaction temperature is defined to be the same as described in the section "A. Block copolymer composition".

When an aromatic vinyl monomer is polymerized under the conditions described above by using a polymerization initiator in a solvent, a solution containing an aromatic vinyl polymer having an active terminal can be obtained. This aromatic vinyl polymer having an active terminal will constitute an aromatic vinyl polymer block ($Ar1^a$) having a relatively small weight average molecular weight of the block copolymer A, and a vinyl polymer block ($Ar^b$) of the block copolymer B. Therefore, the amount of the aromatic vinyl monomer used at this time is determined in accordance with the intended weight average molecular weights of these polymer blocks.

The next step is a step of adding a conjugated diene monomer to the solution containing an aromatic vinyl polymer having an active terminal which is obtained as described above. Through this addition of the conjugated diene monomer, a conjugated diene polymer chain is formed from the active terminal, and thus a solution containing an aromatic vinyl-conjugated diene block copolymer (diblock form) having an active terminal is obtained. The amount of the conjugated diene monomer used at this time is determined such that the resulting conjugated diene polymer chain has the weight average molecular weight of the intended conjugated diene polymer block ($D^b$) of the block copolymer B.

In the subsequent step, a coupling agent is added to the solution containing the aromatic vinyl-conjugated diene block copolymer (diblock form) having an active terminal, which is obtained as described above, in an amount such that the amount of the functional groups of the coupling agent relative to the active terminal of the aromatic vinyl-conjugated diene block copolymer is less than 1 molar equivalent.

The coupling agent that is added and the amount thereof are defined to be the same as those described in the section "A. Block copolymer composition".

As discussed above, when a coupling agent is added to the solution containing the aromatic vinyl-conjugated diene-block copolymer (diblock form) having an active terminal in an amount such that the amount of the functional groups relative to the active terminal of the aromatic vinyl-conjugated diene block copolymer is less than 1 molar equivalents, in a portion of the aromatic vinyl-conjugated diene block copolymer (diblock form) having an active terminal, a conjugated diene polymer block is linked to another conjugated diene polymer block via a coupling agent residue, and as a result, the block copolymer B of the block copolymer composition is formed. Then, the remaining portion of the aromatic vinyl-conjugated diene block copolymer (diblock form) having an active terminal remains unreacted in the solution.

In the subsequent step, an aromatic vinyl monomer is added to the solution that is obtained as described above. When the aromatic vinyl monomer is added to the solution, an aromatic vinyl polymer chain is formed from the terminal of the aromatic vinyl-conjugated diene block copolymer (diblock form) having an active terminal, which is left unreacted with the coupling agent. This aromatic vinyl polymer chain will constitute the aromatic vinyl polymer block ($Ar2^a$) having a relatively large weight average molecular weight of the block copolymer A, which constitutes the block copolymer composition. Therefore, the amount of the aromatic vinyl monomer used at this time is determined in accordance with the intended weight average molecular weight of the aromatic vinyl polymer block ($Ar2^a$). This step of adding an aromatic vinyl monomer leads to the formation of an asymmetric aromatic vinyl-conjugated diene-aromatic vinyl block copolymer which will constitutes the block copolymer A, and as a result, a solution containing the block copolymer A and the block copolymer B is obtained. In addition, a conjugated diene monomer may be added to the solution containing the aromatic vinyl-conjugated diene block copolymer (diblock form) having an active terminal which has not reacted with the coupling agent, before this step of adding the aromatic vinyl monomer. When a conjugated diene monomer is added as such, the weight average molecular weight of the conjugated diene polymer block ($D^a$) of the block copolymer A can be made larger as compared with the case where the conjugated diene monomer is not added. Furthermore, a polymerization terminator (water, methanol, or the like) may be added to the solution containing the aromatic vinyl-conjugated diene block copolymer having an active terminal which has not reacted with the coupling agent, in an amount smaller than the equivalent of the active terminal. When a polymerization terminator is added as such, the active terminal of the aromatic vinyl-conjugated diene block copolymer (diblock form) is deactivated, and thereby, the aromatic vinyl-conjugated diene block copolymer (diblock form) thus obtainable is included in the block copolymer composition.

In the next step, the intended block copolymer composition is collected from the solution containing the block copolymer A and the block copolymer B that is obtained as described above. The method for collection may be carried out according to a conventional method, and is defined to be the same as described in the section "A. Block copolymer composition".

According to the production method as described above, since the block copolymer A and the block copolymer B can be continuously obtained in a same reaction vessel, the target block copolymer composition can be obtained with superior productivity as compared with the case of individually producing the respective block copolymers and mixing them. Furthermore, since the various polymer blocks of the respective block copolymers in the resulting block copolymer composition have weight average molecular weights that are balanced in a particularly desirable manner in view of obtaining the hot-melt adhesive composition of the current embodiment, there is obtained a hot-melt adhesive composition which is excellent in appliability and is excellently balanced between holding power and the adhesive force.

The hot-melt adhesive composition of the current embodiment is a composition containing the block copolymer composition and a tackifying resin. As the tackifying resin that is used in the current embodiment, conventionally known tackifying resins can be used. Specific examples thereof include rosin; modified rosins such as disproportionate rosin and dimerized rosin; esterification products between polyhydric alcohols such as glycol, glycerin and pentaerythritol, and rosin or modified rosins; terpene resins; aliphatic, aromatic, alicyclic, or aliphatic-aromatic copolymer-based hydrocarbon resins, or hydrogenation products thereof; phenolic resins; and coumarone-indene resins. A tackifying resin that is particularly preferably used is an aliphatic or aliphatic-aromatic copolymer-based hydrocarbon resin which is highly compatible with the block copolymer composition described above. There are no particular limitations on the amount of use of the tackifying resin in the hot-melt adhesive composition of the current embodiment, but the amount of use is usually 50 to 400 parts by weight, preferably 60 to 350 parts by weight, and more preferably 70 to 300 parts by weight, per 100 parts by weight of the block copolymer composition. In addition, the tackifying resins may be used singly, or two or more kinds thereof may be used in combination.

The hot-melt adhesive composition of the current embodiment preferably further contains a softening agent. As the softening agent, conventionally known softening agents can be used. Specifically, use can be made of aromatic, paraffinic or naphthenic extender oils; liquid polymers such as polybutene and polyisobutylene; and the like, which are conventionally added to hot-melt adhesive compositions. There are no particular limitations on the amount of use of the softening agent, but the amount of use is 500 parts by weight or less, preferably 10 to 350 parts by weight, and more preferably 30 to 250 parts by weight, per 100 parts by weight of the block copolymer composition. The softening agents may be used singly, or two or more kinds may be used in combination.

In the hot-melt adhesive composition of the current embodiment, an antioxidant can be added according to necessity. There are no particular limitations on the type, and examples thereof that can be used include hindered phenol-based compounds such as pentaerythritol tetrakis[3-(3,5-di-t-butyl-4-hydroxyphenyl)propionate], 2,6-di-t-butyl-p-cresol, and di-t-butyl-4-methylphenol; thiodicarboxylate esters such as dilaurylthiopropionate; and phosphorous acid salts such as tris(nonylphenyl)phosphite. There are no particular limitations on the amount of use of the antioxidant, but the amount of use is usually 10 parts by weight or less, and preferably 0.5 to 5 parts by weight, per 100 parts by weight of the block copolymer composition. The antioxidants may be used singly, or two or more kinds may be used in combination.

The hot-melt adhesive composition of the current embodiment can further contain other additives such as a thermal stabilizer, an ultraviolet absorber, and a filler. In addition, the hot-melt adhesive composition of the current embodiment is preferably a solvent-free composition which does not contain a solvent.

Upon the preparation of the hot-melt adhesive composition of the current embodiment, the method of mixing the block copolymer composition with a tackifying resin or various additives is not particularly limited, and examples of the method include a method of dissolving various components in a solvent, uniformly mixing them, and then removing the solvent by heating or the like; and a method of heating, melting and mixing various components with a kneader or the like.

When the hot-melt adhesive composition of the current embodiment is used, there are no particular limitations on the method of applying the adhesive composition on various members, but application of the adhesive composition can be carried out by, for example, techniques such as T-die coating, roll coating, multi-bead coating, spray coating and foam coating.

The hot-melt adhesive composition of the current embodiment can be easily applied at a relatively low temperature, has a long open time, and also has high holding power. Therefore, the hot-melt adhesive composition of the current embodiment can be conveniently applied to the adhesion of various members, and can achieve high-holding power adhesion with high productivity and with less energy.

The hot-melt adhesive composition of the current embodiment is applicable to various applications, and there are no limitations on the use. However, since the hot-melt adhesive composition has satisfactory appliability at a relatively low temperature, the hot-melt adhesive composition is suitably used in the hot melt adhesion of members having a risk of combustion or deterioration at high temperature, and can be suitably used for the adhesion of thermoplastic resin sheets or non-woven fabrics, particularly in the manufacture of disposable diapers or sanitary napkins.

2. Second embodiment

Next, a second embodiment of the hot-melt adhesive composition of the present invention will be described.

The hot-melt adhesive composition of the current embodiment is an adhesive composition containing the block copolymer composition described above, and a tackifying resin.

The aforementioned block copolymers are defined to be the same as described in the section "A. Block copolymer composition", and explanations thereon will not be repeated here.

As the tackifying resin used in the current embodiment, conventionally known tackifying resins can be used. Specifically, the same tackifying resins as described in the section "2. Second embodiment" can be used.

The hot-melt adhesive composition of the current embodiment preferably further contains a softening agent. The softening agent and the amount of use thereof are defined to be the same as those described in the section "2. Second embodiment".

The hot-melt adhesive composition of the current embodiment can contain an antioxidant according to necessity. The type of the antioxidant and the amount of use thereof are defined to be the same as those described in the section "2. Second embodiment".

The hot-melt adhesive composition of the current embodiment may further contain other additives such as a thermal stabilizer, an ultraviolet absorber, and a filler. In addition, the hot-melt adhesive composition of the current embodiment is preferably a solvent-free composition which does not contain a solvent.

Upon the preparation of the hot-melt adhesive composition of the current embodiment, there are no particular limitations on the method of mixing the block copolymer composition with a tackifying resin or various additives, and the method of mixing is defined to be the same as described in the section "2. Second embodiment".

When the hot melt tacky adhesive of the current embodiment is used, there are no particular limitations on the method of applying the adhesive on various members, but the method of application may be defined to be the same as described in the section "2. Second embodiment".

The hot-melt adhesive composition of the current embodiment can be easily applied at a relatively low temperature, has a long open time, and is excellent in holding power or tackiness. Therefore, the hot-melt adhesive composition of the current embodiment can be conveniently applied to the adhesion of various members, and can achieve high-holding power adhesion with high productivity and with less energy. Furthermore, the hot-melt adhesive composition of the current embodiment has a high shear adhesion failure temperature, and is also excellent in the adhesive strength at high temperature.

The hot-melt adhesive composition of the current embodiment can be applied to various applications, and there are no limitations on the use. However, since the hot-melt adhesive composition has satisfactory appliability at a relatively low temperature, the hot-melt adhesive composition is suitably used for hot melt adhesion of members having a risk of combustion or deterioration at high temperature, and can be suitably used for the adhesion of thermoplastic resin sheets or non-woven fabrics, particularly in the manufacture of disposable diapers or sanitary napkins. Furthermore, since the hot-melt adhesive composition of the current embodiment is excellent in holding power or tackiness and has satisfactory appliability at a relatively low temperature, the hot-melt adhesive composition is suitably used as an adhesive for various adhesive tapes and labels, so that adhesive tapes or labels having excellent holding power or tackiness can be obtained with less energy and high productivity.

EXAMPLES

Hereinafter, the present invention will be more specifically described by way of Examples and Comparative Examples. In addition, the units "parts" and "percentage (%)" in the respective Examples are on a weight basis unless particularly stated otherwise.

Various analyses were carried out according to the following methods.

[Weight Average Molecular Weights of Block Copolymers and Block Copolymer Composition]

The weight average molecular weight was determined as a molecular weight relative to polystyrene standards, by high performance liquid chromatography using tetrahydrofuran as a carrier at a flow rate of 0.35 ml/min. For the apparatus, HLC8220™ manufactured by Tosoh Corporation was used, and three connected columns of Shodex KF-404HQ™ manufactured by Showa Denko K.K. (column temperature 40° C.) were used. A differential refractometer and an ultraviolet detector were used as the detectors, and the calibration of molecular weight was carried out using 12 samples of standard polystyrenes (from 500 to 3,000,000) manufactured by Polymer Laboratories, Ltd.

[Weight Ratios of Block Copolymers]

The weight ratios were determined from the area ratios of the peaks corresponding to the respective block copolymers in the charts obtained by high performance liquid chromatography as described above.

[Weight Average Molecular Weight of Styrene Polymer Block]

The block copolymer was allowed to react with ozone and was reduced with lithium aluminum hydride according to the method described in Rubber Chem. Technol., 45, 1295 (1972), and thereby the isoprene polymer block of the block copolymer was decomposed. Specifically, the operation was carried out by the following procedure. That is, 300 mg of a sample was dissolved in a reaction vessel charged with 100 ml of dichloromethane that had been treated with a molecular sieve. This reaction vessel was placed in a cooling bath and was kept at −25° C. While oxygen was passed into the reaction vessel at a flow rate of 170 ml/min, ozone generated by an ozone generator was introduced into the reaction vessel. After a lapse of 30 minutes from the initiation of reaction, the gas flowing out from the reaction vessel was introduced into an aqueous solution of potassium iodide, and thereby completion of the reaction was confirmed. Subsequently, 50 ml of diethyl ether and 470 mg of lithium aluminum hydride were introduced into another reaction vessel which had been substituted with nitrogen, and while the reaction vessel was cooled with ice water, the ozone-reacted solution was slowly added dropwise to this reaction vessel. Then, the reaction vessel was placed in a water bath and gradually heated, and the content of the reaction vessel was heated to reflux for 30 minutes at 40° C. Subsequently, dilute hydrochloric acid was added dropwise in small amounts to the reaction vessel while the solution was stirred, and the dropwise addition was continued until the generation of hydrogen was almost undetectable. After this reaction, the solid product formed in this solution was separated by filtration, and the solid product was extracted with 100 ml of diethyl ether for 10 minutes. This extract was combined with the filtrate obtained at the time of separation by filtration, and the solvent was distilled off to obtain a solid sample. The sample thus obtained was analyzed for the weight average molecular weight according to the above-described method for measuring the weight average molecular weight, and the value thereof was designated as the weight average molecular weight of a styrene polymer block.

[Weight Average Molecular Weight of Isoprene Polymer Block]

From the respective weight average molecular weights of the block copolymers determined as described above, the weight average molecular weight of a corresponding styrene polymer block was subtracted, and the weight average molecular weight of an isoprene polymer block was determined based on the calculated values.

[Styrene Unit Content of Block Copolymer]

The styrene unit content was determined based on the intensity ratio of the detection made by the differential refractometer and the ultraviolet detector in the analysis carried out by high performance liquid chromatography. Copolymers having different styrene unit contents were prepared in advance, and a calibration curve was produced using the copolymers.

[Styrene Unit Content of Block Copolymer Composition]

The styrene unit content was determined based on an analysis by proton NMR.

[Vinyl Bond Content of Isoprene Polymer Block]

The vinyl bond content was determined based on an analysis by proton NMR.

[Tackiness of Hot-Melt Adhesive Composition]

The loop tack was measured according to FINAT-1991 FTM-9 (Quick-stick tack measurement), and thus tackiness was evaluated. A larger value means excellent tackiness.

[Adhesive Force of Hot-Melt Adhesive Composition]

The adhesive force was evaluated by measuring the peel adhesive strength at normal temperature (N/m), at 23° C. using a hard polyethylene plate as an adherend, according to PSTC-1 (a 180° peel adhesion test according to the Pressure Sensitive Tape Council of the USA). A larger value means excellent adhesive force.

[Holding Power of Hot-Melt Adhesive Composition]

Holding power of the sample was evaluated using an adhesive tape having a width of 10 mm as a sample, and using hard polyethylene as an adherend, based on the time (minute) taken by the sample to peel off under the conditions of using an adhesive part having an area of 10×25 mm, a load of $3.92 \times 10^4$ Pa, and a temperature of 40° C., according to PSTC-6 (holding power test method according to the Pressure Sensitive Tape Council of the USA). A larger value means excellent holding power.

[Shear Adhesion Failure Temperature (SAFT) of Hot-Melt Adhesion Composition]

The shear adhesion failure temperature (SAFT) was measured using stainless steel as an adherend, under the conditions of using an adhesive part having an area of 10×25 mm, a load of $3.92 \times 10^4$ Pa, and a rate of temperature increase of 0.5° C./rain. A larger value means excellent adhesive force at high temperature.

[Melt Viscosity of Hot-Melt Adhesive Composition]

A sample was heated to melt, and the melt viscosities (mPa·s) at 120° C., 140° C. and 160° C. were measured with a Brookfield Thermocell viscometer, using Rotor No. 27. A smaller value means excellent easy appliability.

Production Example 1

In a pressure resistant reactor, 23.3 kg of cyclohexane, 2.6 millimoles of N,N,N',N'-tetramethylethylenediamine (hereinafter, referred to as TMEDA), and 1.43 kg of styrene were added, and while the mixture was stirred at 40° C., 176.2 millimoles of n-butyllithium was added thereto. While the temperature was elevated to 50° C., polymerization was carried out for one hour. The polymerization conversion ratio for styrene was 100% by weight. Subsequently, while the temperature was controlled to be maintained at 50° C. to 60° C., 6.50 kg of isoprene was continuously added to the reactor over one hour. After completion of the addition of isoprene, polymerization was carried out for another one hour. The polymerization conversion ratio for isoprene was 100%. Thereafter, 61.7 millimoles of dimethyldichlorosilane was added to the reactor as a coupling agent, and a coupling reaction was carried out for 2 hours. Thus, a styrene-isoprene-styrene block copolymer was formed, which would serve as a block copolymer B. Thereafter, while the temperature was controlled to be maintained at 50° C. to 60° C., 2.07 kg of styrene was continuously added to the reactor over one hour. After completion of the addition of styrene, polymerization was carried out for another one hour, and thus a styrene-isoprene-styrene block copolymer was formed, which would serve as a block copolymer A. The polymerization conversion ratio for styrene was 100%. Subsequently, 352.4 millimoles of methanol was added 70 the system as a polymerization terminator, the resulting mixture was thoroughly mixed, and the reaction was terminated. The amounts of the various agents used in the reaction are summarized in Table 1. A portion of the reaction liquid thus obtained was taken out, and the weight average molecular weights of the respective block copolymers and the block copolymer composition, the weight average molecular weights of the respective styrene polymer blocks, the weight average molecular weights of the respective isoprene polymer blocks, the styrene unit contents of the respective block copolymers, the styrene unit content of the block copolymer composition, and the vinyl bond content of the isoprene polymer block were determined. These values are presented in Table 2. To 100 parts of the reaction liquid thus obtained (containing 30 parts of the polymer components), 0.3 parts of 2,6-di-tert-butyl-p-cresol was added as an antioxidant and mixed with the reaction liquid. The mixed solution was added dropwise in small amounts into hot water which was heated to 85° C. to 95° C. to thereby volatilize the solvent, and a precipitate was thus obtained. This precipitate was pulverized and dried with hot air at 85° C. Thus, a block copolymer composition of Production Example 1 was collected.

TABLE 1

| | Production Example | | | | | Comparative Production Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| Cyclohexane (kg) | 23.3 | 23.3 | 23.3 | 23.3 | 23.3 | 23.3 | 23.3 | 23.3 | 23.3 | 23.3 | 23.3 | 23.3 |
| TMEDA (millimoles) | 2.6 | 2.6 | 2.5 | 2.5 | 1.8 | 2.5 | 2.2 | 1.2 | 2.0 | 1.9 | 1.9 | 2.0 |
| n-butyllithium (millimoles) | 176.2 | 175.7 | 164.7 | 168.8 | 117.7 | 169.9 | 148.2 | 77.9 | 135.1 | 125.8 | 125.0 | 130.2 |
| Styrene (kg) [$1^{st}$ stage of polymerization] | 1.43 | 1.83 | 1.60 | 1.60 | 1.23 | 1.50 | 1.85 | 4.15 | 2.23 | 1.43 | 3.30 | 1.80 |
| Isoprene (kg) [$2^{nd}$ stage of polymerization] | 6.50 | 5.20 | 5.20 | 5.20 | 5.60 | 7.00 | 6.30 | 5.20 | 5.20 | 6.5 | 6.40 | 6.40 |
| Dimethyldichlorosilane (millimoles) [After $2^{nd}$ stage of polymerization] | 61.7 | 55.8 | 65.9 | 71.8 | 19.4 | — | — | — | 21.6 | 2.58 | — | — |
| Methanol (millimoles) [After $2^{nd}$ stage of polymerization] | — | — | — | — | 14.1 | — | — | — | — | — | — | — |
| Styrene (kg) [$3^{rd}$ stage of polymerization] | 2.07 | 2.97 | 3.20 | 3.20 | 3.20 | 1.50 | 1.85 | 0.65 | 2.57 | 2.07 | 0.30 | 1.80 |
| Methanol (millimoles) [After $3^{rd}$ stage of polymerization] | 352.4 | 351.4 | 329.4 | 337.7 | 235.4 | 339.8 | 296.4 | 155.9 | 270.1 | 251.6 | 250.0 | 260.4 |

TABLE 2

| | Production Example | | | | | Comparative Production Example | |
|---|---|---|---|---|---|---|---|
| | 1 | 2 | 3 | 4 | 5 | 1 | 2 |
| Block copolymer A | | | | | | | |
| Weight average molecular weight of relatively small styrene block (Ar1$^a$) [Mw (Ar1$^a$)] | 9000 | 11000 | 10000 | 10000 | 11000 | — | — |
| Weight average molecular weight of relatively large styrene block (Ar2$^a$) [Mw (Ar2$^a$)] | 51000 | 57000 | 153000 | 320000 | 49000 | — | — |
| Mw (Ar2$^a$)]/[Mw (Ar1$^a$)] | 5.7 | 5.2 | 15.3 | 32.0 | 4.5 | — | — |
| Weight average molecular weight of isoprene block (D$^a$) [Mw(D$^a$)] | 59000 | 49000 | 52000 | 62000 | 84000 | — | — |
| Vinyl bond content of isoprene block (D$^a$) (%) | 7 | 7 | 7 | 7 | 7 | — | — |
| Weight average molecular weight of block copolymer A | 119000 | 117000 | 215000 | 392000 | 144000 | — | — |
| Styrene unit content of block copolymer A (%) | 56 | 66 | 77 | 82 | 50 | — | — |
| Block copolymer B | | | | | | | |
| Weight average molecular weight of styrene block (Ar$^b$) | 9000 | 11000 | 10000 | 10000 | 11000 | 13000 | 15000 |
| Weight average molecular weight of isoprene block (D$^b$) [Mw(D$^b$)] | 55000 | 46000 | 48500 | 47500 | 80000 | 25000 | 31000 |
| Vinyl bond content of isoprene block (D$^b$) (%) | 7 | 7 | 7 | 7 | 7 | 7 | 7 |
| Weight average molecular weight of block copolymer B | 128000 | 114000 | 117000 | 115000 | 182000 | 76000 | 92000 |
| Styrene unit content of block copolymer B (%) | 18 | 26 | 23 | 23 | 18 | 30 | 37 |
| Block copolymer A/block copolymer B (weight ratio) | 36/64 | 45/55 | 42/58 | 37/63 | 80/20 | — | — |
| Styrene-isoprene block copolymer | | | | | | | |
| Weight average molecular weight of styrene block | — | — | — | — | 11000 | — | — |
| Weight average molecular weight of isoprene block | — | — | — | — | 80000 | — | — |
| Content in all polymer components in composition (%) | — | — | — | — | 8 | — | — |
| Block copolymer composition (overall) | | | | | | | |
| Weight average molecular weight | 121000 | 115000 | 149000 | 186000 | 149000 | 76000 | 92000 |

TABLE 2-continued

|  | | | | | | | |
|---|---|---|---|---|---|---|---|
| Molecular weight distribution (Mw/Mn) | 1.11 | 1.12 | 1.21 | 1.50 | 1.10 | 1.02 | 1.02 |
| Styrene unit content (%) | 35 | 48 | 48 | 48 | 44 | 30 | 37 |

|  |  | Comparative Production Example | | | | |
|---|---|---|---|---|---|---|
|  |  | 3 | 4 | 5 | 6 | 7 |
|  | Block copolymer A | | | | | |
|  | Weight average molecular weight of relatively small styrene block (Ar1$^a$) [Mw (Ar1$^a$)] | 15000 | 18500 | 10500 | 2500 | |
|  | Weight average molecular weight of relatively large styrene block (Ar2$^a$) [Mw (Ar2$^a$)] | 76000 | 60000 | 15000 | 27000 | |
|  | Mw (Ar2$^a$)]/[Mw (Ar1$^a$) | 5.1 | 3.2 | 1.4 | 10.8 | |
|  | Weight average molecular weight of isoprene block (D$^a$) [Mw(D$^a$)] | 133000 | 64500 | 67500 | 210500 | |
|  | Vinyl bond content of isoprene block (D$^a$) (%) | 7 | 7 | 7 | 7 | |
|  | Weight average molecular weight of block copolymer A | 224000 | 143000 | 93000 | 240000 | |
|  | Styrene unit content of block copolymer A (%) | 48 | 56 | 44 | 36 | |
|  | Block copolymer B | | | | | |
|  | Weight average molecular weight of styrene block (Ar$^b$) | — | 18500 | 10500 | — | 15000 |
|  | Weight average molecular weight of isoprene block (D$^b$) [Mw(D$^b$)] | — | 63000 | 79500 | — | 40000 |
|  | Vinyl bond content of isoprene block (D$^b$) (%) | — | 7 | 7 | — | 7 |
|  | Weight average molecular weight of block copolymer B | — | 163000 | 180000 | — | 110000 |
|  | Styrene unit content of block copolymer B (%) | — | 30 | 18 | — | 36 |
|  | Block copolymer A/block copolymer B (weight ratio) | — | 70/30 | 65/35 | — | — |
|  | Styrene-isoprene block copolymer | | | | | |
|  | Weight average molecular weight of styrene block | — | — | — | — | — |
|  | Weight average molecular weight of isoprene block | — | — | — | — | — |
|  | Content in all polymer components in composition (%) | — | — | — | — | — |

TABLE 2-continued

| Block copolymer composition (overall) | | | | | |
|---|---|---|---|---|---|
| Weight average molecular weight | 224000 | 140000 | 124000 | 240000 | 110000 |
| Molecular weight distribution (Mw/Mn) | 1.03 | 1.15 | 1.24 | 1.02 | 1.10 |
| Styrene unit content (%) | 48 | 48 | 35 | 36 | 36 |

Production Examples 2 to 4

Block copolymer compositions were produced in the same manner as in Production Example 1, except that the amounts of styrene, n-butyllithium, TMEDA, isoprene, dimethyldichlorosilane, and methanol were respectively changed as indicated in Table 1, and thus block copolymer compositions of Production Examples 2 to 4 were collected. The block copolymer compositions of Production Examples 2 to 4 were subjected to the same analyses as in Production Example 1. The results are presented in Table 2.

Production Example 5

In a pressure resistant reactor, 23.3 kg of cyclohexane, 1.8 millimoles of TMEDA, and 1.23 kg of styrene were added, and while the mixture was stirred at 40° C., 117.7 millimoles of n-butyllithium was added thereto. While the temperature was elevated to 50° C., polymerization was carried out for one hour. The polymerization conversion ratio for styrene was 100% by weight. Subsequently, while the temperature was controlled to be maintained at 50° C. to 60° C., 5.60 kg of isoprene was continuously added to the reactor over one hour. After completion of the addition of isoprene, polymerization was carried out for another one hour. The polymerization conversion ratio for isoprene was 100%. Thereafter, 19.4 millimoles of dimethyldichlorosilane was added to the reactor as a coupling agent, and a coupling reaction was carried out for 2 hours. Thus, a styrene-isoprene-styrene block copolymer was formed, which would serve as a block copolymer B. Subsequently, 14.1 millimoles of methanol was added to the reactor, and thereby the active terminal of a portion of the styrene-isoprene block copolymer was deactivated. Thereafter, while the temperature was controlled to be maintained at 50° C. to 60° C., 3.20 kg of styrene was continuously added to the reactor over one hour. After completion of the addition of styrene, polymerization was carried out for another one hour, and thus a styrene-isoprene-styrene block copolymer was formed, which would serve as a block copolymer A. The polymerization conversion ratio for styrene was 100%. Subsequently, 235.4 millimoles of methanol was added to the system as a polymerization terminator, the resulting mixture was thoroughly mixed, and the reaction was terminated. A portion of the reaction liquid thus obtained was taken out, and the same analyses as in Production Example 1 were carried out. These values are presented in Table 2. The subsequent operation was carried out in the same manner as in Production Example 1, and a block copolymer composition of Production Example 5 was collected.

Comparative Production Example 1

In a pressure resistant reactor, 23.3 kg of cyclohexane, 2.5 millimoles of TMEDA, and 1.50 kg of styrene were added, and while the mixture was stirred at 40° C., 169.9 millimoles of n-butyllithium was added thereto. While the temperature was elevated to 50° C., polymerization was carried out for one hour. The polymerization conversion ratio for styrene was 100% by weight. Subsequently, while the temperature was controlled to be maintained at 50° C. to 60° C., 7.00 kg of isoprene was continuously added to the reactor over one hour. After completion of the addition of isoprene, polymerization was carried out for another one hour. The polymerization conversion ratio for isoprene was 100%. Thereafter, while the temperature was controlled to be maintained at 50° C. to 60° C., 1.50 kg of styrene was continuously added over one hour. After completion of the addition of styrene, polymerization was further carried out for one hour, and thus a styrene-isoprene-styrene block copolymer was formed. The polymerization conversion ratio for styrene was 100%. Subsequently, 339.8 millimoles of methanol was added to the reaction liquid as a polymerization terminator. The resulting mixture was thoroughly mixed, and thereby the reaction was terminated. A portion of the reaction liquid thus obtained was taken out, and the same analyses as in Production Example 1 were carried out. These values are presented in Table 2. The subsequent operation was carried out in the same manner as in Production Example 1, and a block copolymer composition of Comparative Production Example 1 was collected.

Comparative Production Examples 2 and 3

Block copolymer compositions were produced in the same manner as in Comparative Production Example 1, except that the amounts of styrene, n-butyllithium, TMEDA, isoprene and methanol were respectively changed as indicated in Table 1, and thus block copolymer compositions of Comparative Production Examples 2 and 3 were collected. The block copolymer compositions of Comparative Production Examples 2 and 3 were subjected to the same analyses as in Production Example 1. The results are presented in Table 2.

Comparative Production Examples 4 and 5

Block copolymer compositions were produced in the same manner as in Comparative Production Example 1, except that the amounts of styrene, n-butyllithium, TMEDA, isoprene, dimethyldichlorosilane and methanol were respectively changed as indicated in Table 1, and thus block copolymer compositions of Comparative Production Examples 4 and 5 were collected. The block copolymer compositions of Comparative Production Examples 4 and 5 were subjected to the same analyses as in Production Example 1. The results are presented in Table 2.

Comparative Production Examples 6 and 7

Block copolymer compositions were produced in the same manner as in Comparative Production Example 1, except that the amounts of styrene, n-butyllithium, TMEDA, isoprene and methanol were respectively changed as indicated in Table 1, and thus block copolymer compositions of Comparative Production Examples 6 and 7 were collected. The block copolymer compositions of Comparative Production Examples 6 and 7 were subjected to the same analyses as in Production Example 1. The results are presented in Table 2.

Example 1

One hundred parts of the block copolymer composition obtained in Production Example 1 was introduced into a stirring blade type kneader, and 167 parts of a tackifying resin (trade name: "Arkon M100", hydrogenated petroleum-based resin, manufactured by Arakawa Chemical Industries, Ltd.), 67 parts of a softening agent (trade name: "Diana Process Oil PW-90", paraffin-based process oil, manufactured by Idemitsu Kosan Co., Ltd.), and 3 parts of an antioxidant (trade name: "Irganox 1010", manufactured by Ciba Specialty Chemicals, Inc.) were added to the kneader. The system was substituted with nitrogen gas, and then the contents were kneaded for one hour at 160° C. to 180° C. Thus, a hot-melt adhesive composition of Example 1 was produced. A portion of the hot-melt adhesive composition thus obtained was used to evaluate the melt viscosity. Furthermore, a sample obtained by applying the hot-melt adhesive composition thus obtained on a polyester film having a thickness of 25 μm, was used in the evaluation of adhesive force and holding power. The results are presented in Table 3.

TABLE 3

| Incorporation (parts) | | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Block copolymer composition | Production Example 1 | 100 | — | — | — | — | — | — | — | — | — | — |
| | Production Example 2 | — | 100 | — | — | — | — | — | — | — | — | — |
| | Production Example 3 | — | — | 100 | — | — | — | — | — | — | — | — |
| | Production Example 4 | — | — | — | 100 | — | — | — | — | — | — | — |
| | Production Example 5 | — | — | — | — | 100 | — | — | — | — | — | — |
| | Comparative Production Example 1 | — | — | — | — | — | 100 | — | — | — | — | — |
| | Comparative Production Example 2 | — | — | — | — | — | — | 100 | — | — | — | — |
| | Comparative Production Example 3 | — | — | — | — | — | — | — | 100 | — | — | — |
| | Comparative Production Example 4 | — | — | — | — | — | — | — | — | 100 | — | — |
| | Comparative Production Example 5 | — | — | — | — | — | — | — | — | — | 100 | — |
| | Comparative Production Example 6 | — | — | — | — | — | — | — | — | — | — | 53 |
| | Comparative Production Example 7 | — | — | — | — | — | — | — | — | — | — | 47 |
| Tackifying resin | | 167 | 167 | 167 | 167 | 167 | 167 | 167 | 167 | 167 | 167 | 167 |
| Softening agent | | 67 | 67 | 67 | 67 | 67 | 67 | 67 | 67 | 67 | 67 | 67 |
| Antioxidant | | 3 | 3 | 3 | 3 | 3 | 3 | 3 | 3 | 3 | 3 | 3 |
| Properties | | | | | | | | | | | | |
| Adhesive force (N/m) | | 380 | 400 | 400 | 380 | 410 | 400 | 430 | 370 | 410 | 400 | 370 |
| Holding power (min) | | 60 | 70 | 480 | 550 | 60 | 30 | 50 | 2 | 50 | 20 | 2 |
| Melt viscosity (mPa·s) | 120° C. | 49500 | 32000 | 25000 | 23000 | 27700 | 150000 | 370000 | 100000 | 330000 | 225000 | 580000 |
| | 140° C. | 14500 | 10500 | 8700 | 9200 | 9450 | 17600 | 21000 | 23000 | 40000 | 26400 | 83000 |
| | 160° C. | 6650 | 4500 | 4000 | 4600 | 4500 | 5400 | 4000 | 11000 | 14000 | 6000 | 22000 |

Examples 2 to 5, Comparative Examples 1 to 5

Hot-melt adhesive compositions of Examples 2 to 5 and Comparative Examples 1 to 5 were produced in the same manner as in Example 1, except that the block copolymer compositions used were changed to the block copolymer compositions obtained in Production Examples 2 to 5 and Comparative Production Examples 1 to 5. The hot-melt adhesive compositions thus obtained were subjected to the same evaluation as in Example 1. The results are presented in Table 3.

Comparative Example 6

A hot-melt adhesive composition of Comparative Example 6 was produced in the same manner as in Example 1, except that the block copolymer composition used was changed to a mixture of 53 parts of the block copolymer composition of Comparative Production Example 6 and 47 parts of the block copolymer composition of Comparative Production Example 7. The hot-melt adhesive composition thus obtained was subjected to the same evaluation as in Example 1. The results are presented in Table 3.

The following matters were found from Table 3. That is, the hot-melt adhesive compositions of the present invention are excellent in the adhesive force and holding power and have low melt viscosities in a wide temperature range, and therefore, it can be said that the hot-melt adhesive compositions can be easily applied at a relatively low temperature and have long open times (Examples 1 to 5). On the contrary, when block copolymer compositions that do not contain asymmetric aromatic vinyl-conjugated diene-aromatic vinyl block copolymers are used, the hot-melt adhesive compositions have high melt viscosities at 120° C. in particular, and application of the compositions at a relatively low temperature is difficult (Comparative Examples 1 and 2). Even if a block copolymer composition contains an asymmetric aromatic vinyl-conjugated diene-aromatic vinyl block copolymer, when a hot-melt adhesive composition using the block copolymer composition that is composed of the block copolymer only is used, the hot-melt adhesive composition has a tendency of having a high melt viscosity and very low holding power (Comparative Example 3). When block copolymer compositions including block copolymers consisting of an asymmetric aromatic vinyl-conjugated diene-aromatic vinyl block copolymer which is different from the block copolymer A used in the present invention and a symmetric aromatic vinyl-conjugated diene-aromatic vinyl block copolymer, are used, the hot-melt adhesive compositions tend to have high melt viscosities at 120° C. and 140° C. in particular, and have low holding power (Comparative Examples 4 to 6).

Production Example 6

In a pressure resistant reactor, 23.3 kg of cyclohexane, 4.50 millimoles of N,N,N',N'-tetramethylethylenediamine (hereinafter, referred to as TMEDA), and 1.33 kg of styrene were added, and while the mixture was stirred at 40° C., 151.5 millimoles of n-butyllithium was added thereto. While the temperature was elevated to 50° C., polymerization was carried out for one hour. The polymerization conversion ratio for styrene was 100% by weight. Subsequently, while the temperature was controlled to be maintained at 50° C. to 60° C., 7.00 kg of isoprene was continuously added to the reactor over one hour. After completion of the addition of isoprene, polymerization was carried out for another one hour. The polymerization conversion ratio for isoprene was 100%. Thereafter, 24.2 millimoles of tetrachlorosilane was added to the reactor as a coupling agent, and a coupling reaction was carried out for 2 hours. Thus, a branched styrene-isoprene-styrene block copolymer was formed, which would serve as a block copolymer Q. After this coupling reaction, 36.4 millimoles of methanol was added to the reactor as a polymerization terminator, and a polymerization termination reaction was carried out for one hour. Thus, the active terminal of a portion of the styrene-isoprene block copolymer having an active terminal was deactivated, and thereby a styrene-isoprene block copolymer was formed, which would serve as a block copolymer R. Subsequently, while the temperature was controlled to be maintained at 50° C. to 60° C., 1.67 kg of styrene was continuously added to the reactor over one hour. After completion of the addition of styrene, polymerization was carried out for another one hour, and thus a styrene-isoprene-styrene block copolymer was formed, which would serve as a block copolymer P. The polymerization conversion ratio for styrene was 100%. Subsequently, 303.0 millimoles of methanol was added thereto as a polymerization terminator, the resulting mixture was thoroughly mixed, and the reaction was terminated. The amounts of the various agents used in the reaction are summarized in Table 4. A portion of the reaction liquid thus obtained was taken out, and the weight average molecular weights of the respective block copolymers and the block copolymer composition, the weight average molecular weights of the respective styrene polymer blocks, the weight average molecular weights of the respective isoprene polymer blocks, the styrene unit contents of the respective block copolymers, the styrene unit content of the block copolymer composition, and the vinyl bond content of the isoprene polymer block were determined. These values are presented in Table 5. To 100 parts of the reaction liquid thus obtained (containing 30 parts of the polymer components), 0.3 part of 2,6-di-tert-butyl-p-cresol was added as an antioxidant and mixed with the reaction liquid. The mixed solution was added dropwise in small amounts into hot water which was heated to 85° C. to 95° C. to thereby volatilize the solvent, and a precipitate was thus obtained. This precipitate was pulverized and dried with hot air at 85° C. Thus, a block copolymer composition of Production Example 6 was collected.

TABLE 4

| | Production Example | | | | | Reference Production Example | | Comparative Production Example | | | |
|---|---|---|---|---|---|---|---|---|---|---|---|
| | 6 | 7 | 8 | 9 | 10 | 1 | 2 | 8 | 9 | 10 | 11 |
| Cyclohexane (Kg) | 23.3 | 23.3 | 23.3 | 23.3 | 23.3 | 23.3 | 23.3 | 23.3 | 23.3 | 23.3 | 23.3 |
| TMEDA (millimoles) | 4.50 | 4.00 | 2.89 | 5.92 | 5.02 | 2.60 | 1.39 | 3.26 | 1.20 | 2.00 | 1.90 |
| n-butyllithium (millimoles) | 151.5 | 134.4 | 96.3 | 197.4 | 167.2 | 175.7 | 92.6 | 217.4 | 77.9 | 110.9 | 125.8 |
| Styrene (kg) [1$^{st}$ stage of polymerization] | 1.33 | 1.33 | 1.19 | 1.89 | 1.69 | 1.83 | 1.50 | 3.70 | 4.15 | 2.23 | 1.43 |
| Isoprene (kg) [2$^{nd}$ stage of polymerization] | 7.00 | 7.00 | 7.00 | 6.00 | 6.00 | 5.20 | 8.50 | 6.30 | 5.20 | 5.20 | 6.50 |
| Dimethyldichlorosilane (millimoles) [After 2$^{nd}$ stage of polymerization] | — | — | — | — | — | 55.8 | — | — | — | 26.1 | 25.8 |
| Tetrachlorosilane (millimoles) [After 2$^{nd}$ stage of polymerization] | 24.2 | 13.4 | 2.89 | 31.6 | 14.6 | — | — | — | — | — | — |
| Tetramethoxysilane (millimoles) [After 2$^{nd}$ stage of polymerization] | — | — | — | — | — | — | — | 18.5 | — | — | — |
| Methanol (millimoles) [After 2$^{nd}$ stage of polymerization] | 36.4 | 64.5 | 70.3 | 49.4 | 86.9 | — | — | — | — | — | — |

TABLE 4-continued

|  | Production Example | | | | | Reference Production Example | | Comparative Production Example | | | |
| --- | --- | --- | --- | --- | --- | --- | --- | --- | --- | --- | --- |
|  | 6 | 7 | 8 | 9 | 10 | 1 | 2 | 8 | 9 | 10 | 11 |
| Styrene (kg) [$3^{rd}$ stage of polymerization] | 1.67 | 1.67 | 1.81 | 2.11 | 2.31 | 2.97 | — | — | 0.65 | 2.57 | 2.07 |
| Methanol (millimoles) [After $3^{rd}$ stage of polymerization] | 303.0 | 268.8 | 192.6 | 394.8 | 334.4 | 351.4 | 185.2 | 434.8 | 155.9 | 221.8 | 251.6 |

TABLE 5

|  | Production Example | | | | | Reference Production Example | |
| --- | --- | --- | --- | --- | --- | --- | --- |
|  | 6 | 7 | 8 | 9 | 10 | 1 | 2 |
| Block copolymer P |  |  |  |  |  |  | — |
| Weight average molecular weight of relatively small styrene block ($Ar1^P$) [$Mw(Ar1^P)$] | 8800 | 9900 | 12200 | 9600 | 10100 | 11000 | — |
| Weight average molecular weight of relatively large styrene block ($Ar2^P$) [$Mw(Az2^P)$] | 92000 | 103000 | 125000 | 97000 | 106000 | 57000 | — |
| Mw ($Ar2^P$)/Mw ($Az1^P$) | 10.4 | 10.4 | 10.2 | 10.1 | 10.5 | 5.2 | — |
| Weight average molecular weight of isoprene block ($D^P$) | 65200 | 74100 | 102800 | 46400 | 51900 | 49000 | — |
| Vinyl bond content of isoprene block ($D^P$) (%) | 7 | 7 | 7 | 7 | 7 | 7 | — |
| Weight average molecular weight of block copolymer P | 166000 | 187000 | 240000 | 153000 | 168000 | 117000 | — |
| Styrene unit content of block copolymer P (%) | 68.5 | 68.5 | 65.5 | 77.8 | 76.4 | 66.0 | — |
| Block copolymer Q |  |  |  |  |  |  |  |
| Weight average molecular weight of styrene block ($Ar^q$) | 8800 | 9900 | 12200 | 9600 | 10100 | 11000 | — |
| Weight average molecular weight of isoprene block ($D^q$) | 65200 | 74100 | 102800 | 46400 | 51900 | 46000 | — |
| Vinyl bond content of isoprene block ($D^q$) (%) | 7 | 7 | 7 | 7 | 7 | 7 | — |
| Weight average molecular weight of block copolymer Q | 278000 | 318000 | 430000 | 203000 | 233000 | 114000 | — |
| Styrene unit content of block copolymer Q (%) | 16.0 | 16.0 | 14.5 | 24.0 | 22.0 | 26.0 | — |
| Block copolymer P/Block copolymer Q (weight ratio) | 38/62 | 50/50 | 85/15 | 41/59 | 62/38 | 45/55 | — |
| Block copolymer R |  |  |  |  |  |  |  |
| Weight average molecular weight of styrene block ($Ar^r$) | 8800 | 9900 | 12200 | 9600 | 10100 | — | 13500 |
| Weight average molecular weight of isoprene block ($D^r$) | 65200 | 74100 | 102800 | 46400 | 51900 | — | 106500 |
| Vinyl bond content of isoprene block ($D^r$) (%) | 7 | 7 | 7 | 7 | 7 | — | 7 |
| Weight average molecular weight of block copolymer R | 74000 | 84000 | 115000 | 56000 | 62000 | — | 120000 |
| Styrene unit content of block copolymer R (%) | 16.0 | 16.0 | 14.5 | 24.0 | 22.0 | — | 15.0 |
| Block copolymer R/(Block copolymer P + Block copolymer Q) (weight ratio) | 20/80 | 40/60 | 60/40 | 20/80 | 40/60 | — | — |
| Block copolymer composition (overall) |  |  |  |  |  |  |  |
| Weight average molecular weight | 208000 | 188000 | 184000 | 158000 | 143000 | 113000 | 120000 |
| Styrene unit content (%) | 30 | 30 | 30 | 40 | 40 | 48 | 31 |

|  | Comparative Production Example | | | |
| --- | --- | --- | --- | --- |
|  | 8 | 9 | 10 | 11 |
| Block copolymer P |  |  |  |  |
| Weight average molecular weight of relatively small styrene block ($Ar1^P$) [$Mw(Ar1^P)$] | — | 15000 | 22000 | 10500 |
| Weight average molecular weight of | — | 76000 | 73000 | 15000 |

TABLE 5-continued

| | | | | |
|---|---|---|---|---|
| relatively large styrene block (Ar$2^P$) [Mw(Az$2^P$)] Mw (Ar$2^P$)/Mw (Az$1^P$) | — | 5.1 | 3.3 | 1.4 |
| Weight average molecular weight of isoprene block (D$^P$) | — | 133000 | 78500 | 67500 |
| Vinyl bond content of isoprene block (D$^P$) (%) | — | 7 | 7 | 7 |
| Weight average molecular weight of block copolymer P | — | 224000 | 170000 | 93000 |
| Styrene unit content of block copolymer P (%) | — | 48.0 | 57.7 | 44.0 |
| Block copolymer Q | | | | |
| Weight average molecular weight of styrene block (Ar$^q$) | 18000 | — | 22000 | 10500 |
| Weight average molecular weight of isoprene block (D$^q$) | 49000 | — | 77500 | 76500 |
| Vinyl bond content of isoprene block (D$^q$) (%) | 7 | — | 7 | 7 |
| Weight average molecular weight of block copolymer Q | 202000 | — | 199000 | 180000 |
| Styrene unit content of block copolymer Q (%) | 37.0 | — | 30.0 | 18.0 |
| Block copolymer P/Block copolymer Q (weight ratio) | — | — | 70/30 | 65/35 |
| Block copolymer R | | | | |
| Weight average molecular weight of styrene block (Ar$^r$) | 18000 | — | — | — |
| Weight average molecular weight of isoprene block (D$^r$) | 49000 | — | — | — |
| Vinyl bond content of isoprene block (D$^r$) (%) | 7 | — | — | — |
| Weight average molecular weight of block copolymer R | 67000 | — | — | — |
| Styrene unit content of block copolymer R (%) | 37.0 | — | — | — |
| Block copolymer R/(Block copolymer P + Block copolymer Q) (weight ratio) | 65/35 | — | — | — |
| Block copolymer composition (overall) | | | | |
| Weight average molecular weight | 118000 | 224000 | 179000 | 124000 |
| Styrene unit content (%) | 37 | 48 | 48 | 35 |

Production Examples 7 to 10

Block copolymer compositions were produced in the same manner as in Production Example 6, except that the amounts of styrene, n-butyllithium, TMEDA, isoprene, dimethyldichlorosilane and methanol were changed as indicated in Table 4, and thus block copolymer compositions of Production Examples 7 to 10 were collected. The block copolymer compositions of Production Examples 7 to 10 were subjected to the same analyses as in Production Example 6. The results are presented in Table 5.

Reference Production Example 1

In a pressure resistant reactor, 23.3 kg of cyclohexane, 2.60 millimoles of TMEDA, and 1.83 kg of styrene were added, and while the mixture was stirred at 40° C., 175.7 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 5.20 kg of isoprene was continuously added to the reactor over one hour. After completion of the addition of isoprene, polymerization was carried out for another one hour. The polymerization conversion ratio for isoprene was 100%. Thereafter, 55.8 millimoles of dimethyldichlorosilane was added to the reactor as a coupling agent, and a coupling reaction was carried out for 2 hours. Thus, a linear styrene-isoprene-styrene block copolymer was formed, which would serve as a block copolymer Q. Thereafter, while the temperature was controlled to be maintained at 50° C. to 60° C., 2.97 kg of styrene was continuously added to the reactor over one hour. After completion of the addition of styrene, polymerization was carried out for another one hour, and thus a styrene-isoprene-styrene block copolymer was formed, which would serve as a block copolymer P. The polymerization conversion ratio for styrene was 100%. Subsequently, 351.4 millimoles of methanol was added to the system as a polymerization terminator, the resulting mixture was thoroughly mixed, and the reaction was terminated. A portion of the reaction liquid thus obtained was taken out, and the same analyses as in Production Example 6 were carried out. These values are presented in Table 5. The subsequent operation was carried out in the same manner as in Production Example 6, and a block copolymer composition of Reference Production Example 1 was collected.

Reference Production Example 2

In a pressure resistant reactor, 23.3 kg of cyclohexane, 1.39 millimoles of TMEDA, and 1.50 kg of styrene were added, and while the mixture was stirred at 40° C., 92.6 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 8.50 kg of isoprene was continuously added to the reactor over one hour. After completion of the addition of isoprene, polymerization was carried out for another one hour. The polymerization conversion ratio for isoprene was 100%. Thereafter, 185.2 millimoles of methanol was added to the system as a polymerization terminator, the resulting mixture was thoroughly mixed, and the reaction was terminated. Thereby, a styrene-isoprene block copolymer was formed, which would serve as a block copolymer R. A portion of the reaction liquid thus obtained was taken out, and the same analyses as in Production Example 6 were carried out. These values are presented in Table 5. The subsequent operation was carried out in the same manner as in Production Example 6, and a block copolymer composition of Reference Production Example 2 was collected.

Comparative Production Example 8

In a pressure resistant reactor, 23.3 kg of cyclohexane, 3.26 millimoles of TMEDA, and 3.70 kg of styrene were added, and while the mixture was stirred at 40° C., 217.4 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 6.3 C kg of isoprene was continuously added to the reactor over one hour. After completion of the addition of isoprene, polymerization was carried out for another one hour. The polymerization conversion ratio for isoprene was 100%. Subsequently, 18.5 millimoles of tetramethoxysilane was added to the reactor as a coupling agent, and a coupling reaction was carried out for 2 hours. Thus, a branched styrene-isoprene-styrene block copolymer was formed. Thereafter, 434.8 millimoles of methanol was added to the system as a polymerization terminator, the resulting mixture was thoroughly mixed, and the reaction was terminated. A portion of the reaction liquid thus obtained was taken out, and the same analyses as in Production Example 6 were carried out. These values are presented in Table 5. The subsequent operation was carried out in the same manner as in Production Example 6, and a block copolymer composition of Comparative Production Example 8 was collected.

Comparative Production Example 9

In a pressure resistant reactor, 23.3 kg of cyclohexane, 1.20 millimoles of TMEDA, and 4.15 kg of styrene were added, and while the mixture was stirred at 40° C., 77.9 millimoles of n-butyllithium was added thereto. While the temperature was elevated to 50° C., polymerization was carried out for one hour. The polymerization conversion ratio for styrene was 100%. Subsequently, while the temperature was controlled to be maintained at 50° C. to 60° C., 5.20 kg of isoprene was continuously added to the reactor over one hour. After completion of the addition of isoprene, polymerization was carried out for another one hour. The polymerization conversion ratio for isoprene was 100%. Subsequently, while the temperature was controlled to be maintained at 50° C. to 60° C., 0.65 kg of styrene was continuously added thereto over one hour. After completion of the addition of styrene, polymerization was carried out for another one hour, and thus a styrene-isoprene-styrene block copolymer was formed. The polymerization conversion ratio for styrene was 100%. Thereafter, 155.9 millimoles of methanol was added to the system as a polymerization terminator, the resulting mixture was thoroughly mixed, and the reaction was terminated. A portion of the reaction liquid thus obtained was taken out, and the same analyses as in Production Example 6 were carried out. These values are presented in Table 5. The subsequent operation was carried out in the same manner as in Production Example 6, and a block copolymer composition of Comparative Production Example 9 was collected.

Comparative Production Examples 10 and 11

Block copolymer compositions were produced in the same manner as in Reference Production Example 1, except that the amounts of styrene, n-butyllithium, TMEDA, isoprene, dimethyldichlorosilane and methanol were changed as indicated in Table 4, and thus block copolymer compositions of Comparative Production Examples 10 and 11 were collected. The block copolymer compositions of Comparative Production Examples 10 and 11 were subjected to the same analyses as in Production Example 6. The results are presented in Table 5.

Example 6

One hundred parts of the block copolymer composition obtained in Production Example 6 was introduced into a stirring blade type kneader, and 167 parts of a tackifying resin (trade name: "Arkon M100", hydrogenated petroleum-based resin, manufactured by Arakawa Chemical Industries, Ltd.), 67 parts of a softening agent (trade name: "Diana Process Oil PW-90", paraffin-based process oil, manufactured by Idemitsu Kosan Co., Ltd.), and 3 parts of an antioxidant (trade name: "Irganox 1010", manufactured by Ciba Specialty Chemicals, Inc.) were added to the kneader. The system was substituted with nitrogen gas, and then the contents were kneaded for one hour at 160° C. to 180° C. Thus, a hot-melt adhesive composition of Example 6 was produced. A sample obtained by applying the hot-melt adhesive composition thus obtained on a polyester film having a thickness of 50 μm, to a thickness of 30 μm, was used in the evaluation of tackiness, adhesive force, holding power, shear adhesion failure temperature, and melt viscosity. The results are presented in Table 6.

TABLE 6

| Incorporation (parts) | | Example 6 | Example 7 | Example 8 | Example 9 | Example 10 | Example 11 | Comparative Example 7 | Comparative Example 8 | Comparative Example 9 | Comparative Example 10 |
|---|---|---|---|---|---|---|---|---|---|---|---|
| Block copolymer composition | Production Example 6 | 100 | — | — | — | — | — | — | — | — | — |
| | Production Example 7 | — | 100 | — | — | — | — | — | — | — | — |
| | Production | — | — | 100 | — | — | — | — | — | — | — |

TABLE 6-continued

| Incorporation (parts) | | Example 6 | Example 7 | Example 8 | Example 9 | Example 10 | Example 11 | Comparative Example 7 | Comparative Example 8 | Comparative Example 9 | Comparative Example 10 |
|---|---|---|---|---|---|---|---|---|---|---|---|
| Example 8 Production | | — | — | — | 100 | — | — | — | — | — | — |
| Example 9 Production | | — | — | — | — | 100 | — | — | — | — | — |
| Example 10 Reference Production | | — | — | — | — | — | 80 | — | — | — | — |
| Example 1 Reference Production | | — | — | — | — | — | 20 | — | 40 | 40 | — |
| Example 2 Comparative Production | | — | — | — | — | — | — | 100 | — | — | — |
| Example 8 Comparative Production | | — | — | — | — | — | — | — | 60 | — | — |
| Example 9 Comparative Production | | — | — | — | — | — | — | — | — | 60 | — |
| Example 10 Comparative Production | | — | — | — | — | — | — | — | — | — | 100 |
| Example 11 | | | | | | | | | | | |
| Tackifying resin | | 167 | 167 | 167 | 167 | 167 | 167 | 167 | 167 | 167 | 167 |
| Softening agent | | 67 | 67 | 67 | 67 | 67 | 67 | 67 | 67 | 67 | 67 |
| Antioxidant | | 3 | 3 | 3 | 3 | 3 | 3 | 3 | 3 | 3 | 3 |
| Properties | | | | | | | | | | | |
| Loop tack (ounce) | | 38 | 41 | 40 | 45 | 50 | 36 | 48 | 25 | 47 | 12 |
| Adhesive force (N/m) | | 540 | 620 | 600 | 640 | 680 | 590 | 640 | 420 | 680 | 400 |
| Holding power (min) | | 280 | 180 | 50 | 350 | 260 | 60 | 65 | 1 | 180 | 20 |
| Shear adhesion failure temperature (° C.) | | 57 | 54 | 52 | 58 | 57 | 55 | 44 | Not measurable | 57 | 50 |
| Melt viscosity (mPa·s) | 120° C. | 28000 | 28500 | 45000 | 24200 | 22000 | 27700 | 340000 | 220000 | 480000 | 225000 |
| | 140° C. | 12000 | 14000 | 16500 | 9200 | 8900 | 9450 | 42000 | 38000 | 72000 | 26400 |
| | 160° C. | 4800 | 4500 | 4000 | 4600 | 5000 | 4500 | 4800 | 15200 | 16000 | 6000 |

Examples 7 to 10

Hot-melt adhesive compositions of Examples 7 to 10 were produced in the same manner as in Example 6, except that the block copolymer compositions used were changed to the block copolymer compositions obtained in Production Examples 7 to 10. The hot-melt adhesive compositions thus obtained were subjected to the same evaluation as in Example 6. The results are presented in Table 6.

Example 11

A hot-melt adhesive composition of Example 6 was produced in the same manner as in Example 6, except that 80 parts of the block copolymer composition of Reference Production Example 1 and 20 parts of the block copolymer of Reference Production Example 2 were used instead of 100 parts of the block copolymer composition of Production Example 6. The hot-melt adhesive composition thus obtained was subjected to the same evaluation as in Example 6. The results are presented in Table 6.

Comparative Example 7

A hot-melt adhesive composition of Comparative Example 7 was produced in the same manner as in Example 6, except that 100 parts of the polymer composition of Comparative Production Example 8 was used instead of 100 parts of the block copolymer composition of Production Example 6. The hot-melt adhesive composition thus obtained was subjected to the same evaluation as in Example 6. The results are presented in Table 6.

Comparative Example 8

A hot-melt adhesive composition of Comparative Example 8 was produced in the same manner as in Example 6, except that 60 parts of the block copolymer composition of Comparative Production Example 9 and 40 parts of the block copolymer of Reference Production Example 2 were used instead of 100 parts of the block copolymer composition of Production Example 6. The hot-melt adhesive composition thus obtained was subjected to the same evaluation as in Example 6. The results are presented in Table 6.

Comparative Example 9

A hot-melt adhesive composition of Comparative Example 9 was produced in the same manner as in Example 6, except that 60 parts of the block copolymer composition of Comparative Production Example 10 and 40 parts of the block copolymer of Reference Production Example 2 were used instead of 100 parts of the block copolymer composition of Production Example 6. The hot-melt adhesive composition thus obtained was subjected to the same evaluation as in Example 6. The results are presented in Table 6.

Comparative Example 10

A hot-melt adhesive composition of Comparative Example 10 was produced in the same manner as in Example 6, except that 100 parts of the polymer composition of Comparative Production Example 11 was used instead of 100 parts of the block copolymer composition of Production Example 6. The hot-melt adhesive composition thus obtained was subjected to the same evaluation as in Example 6. The results are presented in Table 6.

The following matters were found from Table 6. That is, the hot-melt adhesive compositions of the present invention are excellent in the adhesive force and holding power and have low melt viscosities in a wide temperature range, and therefore, it can be said that the hot-melt adhesive compositions can be easily applied at a relatively low temperature, have long open times, and are also excellent in tackiness or the shear adhesion failure temperature (Examples 6 to 11). On the contrary, when a block copolymer composition that does not contain an asymmetric aromatic vinyl-conjugated diene-aromatic vinyl block copolymer is used, the hot-melt adhesive composition has high melt viscosity at 120° C. in particular, application of the composition at a relatively low temperature is difficult, and the shear adhesion failure temperature is poor (Comparative Example 7). Furthermore, even if a block copolymer composition contains an asymmetric aromatic vinyl-conjugated diene-aromatic vinyl block copolymer and an aromatic vinyl-conjugated diene block copolymer, when a hot-melt adhesive composition using the block copolymer composition that does not contain a block copolymer corresponding to the block copolymer Q is used, the hot-melt adhesive composition has a tendency of having a high melt viscosity and very low holding power (Comparative Example 8). When block copolymer compositions including block copolymers consisting of an asymmetric aromatic vinyl-conjugated diene-aromatic vinyl block copolymer which is different from the block copolymer P used in the present invention and a symmetric aromatic vinyl-conjugated diene-aromatic vinyl block copolymer, are used, the hot-melt adhesive compositions have high melt viscosities at 120° C. and 140° C. in particular, and application of the adhesive composition at a relatively low temperature is difficult (Comparative Examples 9 and 10).

Industrial Applicability

The hot-melt adhesive composition of the present invention can be applied to various applications, and there are no limitations on the use. However, since the hot-melt adhesive composition has satisfactory appliability at a relatively low temperature, the hot-melt adhesive composition is suitably used in the hot melt adhesion of members having a risk of combustion or deterioration at high temperature, and can be suitably used for the adhesion of thermoplastic resin sheets or non-woven fabrics, particularly in the manufacture of disposable diapers or sanitary napkins.

The invention claimed is:

1. A hot-melt adhesive composition comprising a block copolymer composition which includes a block copolymer A represented by the following general formula (A) and a block copolymer B represented by the following general formula (B), and a tackifying resin,
wherein a weight ratio (A/B) of the block copolymer A and the block copolymer B in the block copolymer composition is 25/75 to 90/10, and an aromatic vinyl monomer unit content of the block copolymer A is 41% or greater:

$$Ar1^a\text{-}D^a\text{-}Ar2^a \qquad (A)$$

$$(Ar^b\text{-}D^b)_n\text{-}X \qquad (B),$$

in the general formulas (A) and (B), $Ar1^a$ and $Ar^b$ each represent an aromatic vinyl polymer block having a weight average molecular weight of 6,000 to 15,000; $Ar2^a$ represents an aromatic vinyl polymer block having a weight average molecular weight of 40,000 to 400,000; $D^a$ and $D^b$ each represent a conjugated diene polymer block having a vinyl bond content of 1 mol % to 20 mol %; X represents a single bond, or a residue of a coupling agent; and n represents an integer of 2 or greater.

2. The hot-melt adhesive composition according to claim 1, wherein in the block copolymer composition, a content of an aromatic vinyl monomer unit relative to all monomer units constituting polymer components in the block copolymer composition is 20% to 70% by weight.

3. A block copolymer composition comprising a block copolymer P represented by the following general formula (P), a block copolymer Q represented by the following general formula (Q), and a block copolymer R represented by the following general formula (R), wherein a weight ratio (P/Q) of the block copolymer P and the block copolymer Q is 25/75 to 90/10, a weight ratio (R/(P+Q)) of the block copolymer R and a total weight of the block copolymer P and the block copolymer Q is 10/90 to 70/30, an aromatic vinyl monomer unit content of the block copolymer P is 41% by weight or greater, and a content of an aromatic vinyl monomer unit relative to all polymer components in the block copolymer composition is 15% to 80% by weight:

$$Ar1^p\text{-}D^p\text{-}Ar2^p \qquad (P)$$

$$(Ar^q\text{-}D^q)_m\text{-}X^q \qquad (Q)$$

$$Ar^r\text{-}D^r \qquad (R),$$

in the general formulas (P), (Q) and (R), $Ar1^p$, $Ar^q$ and $Ar^r$ each represent an aromatic vinyl polymer block having a weight average molecular weight of 6,000 to 20,000; $Ar2^p$ represents an aromatic vinyl polymer block having a weight average molecular weight of 40,000 to 400,000; $D^p$, $D^q$ and $D^r$ each represent a conjugated diene polymer block having a vinyl bond content of 1 mol % to 20 mol %; $X^q$ represents a single bond, or a residue of a coupling agent; and m represents an integer of 2 or greater.

4. A hot-melt adhesive composition, comprising the block copolymer composition according to claim 3 and a tackifying resin.

* * * * *